(12) United States Patent
Fujii

(10) Patent No.: US 7,152,872 B2
(45) Date of Patent: Dec. 26, 2006

(54) AIR-BAG-DOOR-EQUIPPED VEHICLE INTERIOR TRIM ARTICLE AND METHOD FOR FABRICATING THE SAME

(75) Inventor: Mutsuo Fujii, Hiroshima (JP)

(73) Assignee: Nishikawa Kasei Co., Ltd., Hiroshima (JP)

( * ) Notice: Subject to any disclaimer, the term of this patent is extended or adjusted under 35 U.S.C. 154(b) by 258 days.

(21) Appl. No.: 10/463,434

(22) Filed: Jun. 18, 2003

(65) Prior Publication Data

US 2004/0041374 A1    Mar. 4, 2004

(30) Foreign Application Priority Data

Aug. 28, 2002 (JP) ............................. 2002-249168
Oct. 25, 2002 (JP) ............................. 2002-310623
Feb. 17, 2003 (JP) ............................. 2003-038513

(51) Int. Cl.
*B60R 21/20* (2006.01)

(52) U.S. Cl. ................................. 280/728.3
(58) Field of Classification Search ............ 280/728.3, 280/728.1, 732
See application file for complete search history.

(56) References Cited

U.S. PATENT DOCUMENTS

| 5,447,328 | A  | * | 9/1995  | Iannazzi et al. ......... 280/728.3 |
| 5,466,000 | A  | * | 11/1995 | Leonard et al. ......... 280/728.3 |
| 6,089,642 | A  |   | 7/2000  | Davis, Jr. et al. |
| 6,467,800 | B1 | * | 10/2002 | Bey et al. ............... 280/728.3 |
| 6,467,801 | B1 | * | 10/2002 | Preisler et al. .......... 280/728.3 |
| 6,644,685 | B1 | * | 11/2003 | Sun et al. ............... 280/728.3 |
| 6,672,611 | B1 | * | 1/2004  | Preisler et al. .......... 280/728.3 |
| 6,692,017 | B1 | * | 2/2004  | Taoka et al. ............ 280/728.2 |
| 2004/0075251 | A1 | * | 4/2004 | Fujii et al. ............... 280/728.3 |

FOREIGN PATENT DOCUMENTS

| EP | 0 689 968 A2 | 1/1996 |
| JP | 07-291078 A  | 11/1995 |
| JP | 2000-71924 A | 3/2000 |
| WO | WO 99/56991  | 11/1999 |
| WO | WO 03/000521 A2 | 1/2003 |

* cited by examiner

*Primary Examiner*—Faye M. Fleming
(74) *Attorney, Agent, or Firm*—Nixon Peabody LLP; Donald R. Studebaker

(57) ABSTRACT

In order to ensure the strength of an air bag door section 17 defined in an instrument panel main body 1 and reliably open the door section 17 upon activation of an air bag device 42, an inventive vehicle interior trim article includes: a back-up plate 20 integrally connected to the bottom face of the door section 17; and a frame body 22 for accommodating the air bag device 42, wherein the back-up plate 20 is integrally formed with the frame body 22 via a hinge section 24, and an extreme end 20b of the back-up plate 20 detachably abuts against a top-side end face 34 of the frame body 22. The back-up plate 20 and frame body 22 are molded so that the extreme end 20b of the back-up plate 20 is spaced apart from the top-side end face 34 of the frame body 22 by a predetermined distance.

5 Claims, 12 Drawing Sheets

AIR-BAG-DOOR-EQUIPPED VEHICLE INTERIOR TRIM ARTICLE AND METHOD FOR FABRICATING THE SAME

BACKGROUND OF THE INVENTION

The present invention generally relates to air-bag-door-equipped vehicle interior trim articles and methods for fabricating the articles.

Among air-bag-door-equipped vehicle interior trim articles that have been conventionally known, Japanese Unexamined Patent Publication No. 7-291078 discloses one in which a reinforcing plate section is fixed to the bottom side of a panel main body by performing caulking utilizing heat, and a frame body for accommodating an air bag device is fastened to the plate section. In the vehicle interior trim article of this type, the frame body is provided with a flange fixture part, and the fixture part and plate section are fastened to each other. The vehicle interior trim article is further provided with: a thin rupturable portion located in the panel main body so as to face the fixture part of the frame body; and a slit opening located in the plate section. In such an arrangement, the rupturable portion is immediately ruptured upon activation of the air bag device.

Japanese Unexamined Patent Publication No. 2000-71924 discloses another conventional air-bag-door-equipped vehicle interior trim article that is provided with a support assembly on the bottom side of a panel main body having a door section. The support assembly includes: an outer rim having an opening; a plate section that is located within the opening, and is vibration welded to the bottom side of the door section; a support wall to which an air bag device is fastened; and a hinge section through which the outer rim is connected to the plate section. The support assembly is provided with gaps each having a predetermined width and each formed between the outer rim and an end of the plate section except a portion of the support assembly at which the hinge section is provided. The vehicle interior trim article is further provided at its panel main body with a thin rupturable portion extending along the gaps. In such an arrangement, upon activation of the air bag device, the rupturable portion is ruptured to open the door section.

In fabricating the vehicle interior trim article, the outer rim, plate section, support wall and hinge section are integrally formed by injection molding, for example, and then the outer rim is welded to the panel main body at a portion thereof located around the door section while the plate section is welded to the bottom face of the door section. In this manner, it becomes possible to obtain the air-bag-door-equipped vehicle interior trim article including the support assembly provided on the bottom side of the panel main body.

On the other hand, U.S. Pat. No. 6,089,642 discloses still another conventional vehicle interior trim article including flexible hinge members provided on the bottom side of a pair of upper and lower door sections that opens toward the rear of a vehicle. These flexible hinge members are formed separately and each include a plate section, a hinge section and a leg section. Each of the leg sections is fixed to a support section extending away from a panel main body, and each of the plate sections is fixed to the corresponding door section. Furthermore, one end of one of the plate sections located opposite to the other end thereof at the hinge section protrudes so as to form a stepped extreme end at the bottom side of the panel, and this extreme end extends beyond a rupturable portion to overlap with the extreme end of the other plate section at the bottom side of the panel.

However, the above-described conventional vehicle interior trim articles present various problems as explained below.

The vehicle interior trim article disclosed in Japanese Unexamined Patent Publication No. 7-291078 additionally requires fasteners such as bolts and nuts in order to fix the frame body to the panel main body, which increases the number of components, the number of steps for assembling the article, and the cost of the components.

The vehicle interior trim article disclosed in Japanese Unexamined Patent Publication No. 2000-71924 is formed to improve its fabrication efficiency by integrally forming the plate section and a frame body including the outer rim, for example, and to easily open the plate section by forming a gap between the extreme end of the plate section and the outer rim. In such an arrangement, however, the plate section cannot sufficiently reinforce the panel main body, and thus the panel main body might be broken by a pressure applied thereon by a vehicle occupant, for example.

Further, in the vehicle interior trim article disclosed in Japanese Unexamined Patent Publication No. 2000-71924, the gap formed between the extreme end of the plate section and the outer rim is similar in width to the gaps formed between the lateral ends of the plate section and the outer rim. However, in order to secure these gaps, the area of the plate section is made small, thus making it difficult to increase the overall strength of the door section by the support assembly. In addition, if any one of the gaps is increased in width, the pressing force of an air bag is concentrated on this gap to prevent the rupturable portion formed at the door section from rupturing. As a result, a part of the panel main body located around the rupturable portion is cracked, and the cracked part is scattered.

To cope with these problems, the width of each of the gaps may be minimized. In such a case, however, the frame body and the plate section might be connected to each other due to burrs during the molding of the support assembly. Therefore, the support assembly cannot be fabricated efficiently unless each of the gaps is kept wide to a certain extent.

On the other hand, in the vehicle interior trim article disclosed in the U.S. Pat. No. 6,089,642, since the extreme end of one of the plate sections is formed to extend beyond the rupturable portion to overlap with the extreme end of the other plate section at the bottom side of the panel, a gap formed between both the plate sections can be closed. However, in order to mold both the plate sections so that the gap therebetween can be closed, the flexible hinge members need to be separately molded, and then they have to be separately attached to the panel main body. Consequently, this conventional arrangement increases not only the number of components but also the complexity of the step of assembling the vehicle interior trim article.

SUMMARY OF THE INVENTION

It is therefore an object of the present invention to provide a vehicle interior trim article in which improvements are made on a plate section and a frame body in order to reliably open a door section upon activation of an air bag device while the strength of a panel main body is ensured.

Another object of the present invention is to increase the stiffness of the door section of the vehicle interior trim article while reliably opening the door section upon activation of the air bag device.

In order to achieve the above objects, the present invention provides a vehicle interior trim article including: a panel main body having a door section; a frame body for accommodating an air bag device; a reinforcing plate section having a base end and an extreme end; and a hinge section, wherein the frame body is provided with a flange section welded to the bottom face of the panel main body at a portion thereof located around the door section, the base end of the plate section is integrally formed with the frame body via the hinge section, the extreme end of the plate section detachably abuts against or neighbors on a surface of the frame body facing the panel main body, and a part of a rupturable portion that is formed in the panel main body and that is adjacent to the extreme end of the plate section is located outwardly of the extreme end of the plate section.

To be more specific, the present invention provides for an air-bag-door-equipped vehicle interior trim article including a panel main body in which a door section is defined with a rupturable portion that is formed in the panel main body and that is to be ruptured to open the door section upon activation of an air bag device.

The interior trim article is characterized in that the interior trim article further includes: a reinforcing plate section that includes a base end and an extreme end, and that is welded to the bottom face of the door section; a frame body, provided in connection with the plate section, for accommodating the air bag device; and a hinge section through which the base end of the plate section is connected to the frame body, the plate section, the frame body and the hinge section are integrally formed, the frame body includes: a rectangular tubular main section extending away from the panel main body; and a flange section that extends outward from an outer end of the tubular main section located adjacent to the panel main body, and that is welded to the bottom face of the panel main body at a portion thereof located outwardly of the door section, the base end of the plate section is integrally formed with the frame body via the hinge section, while the extreme end of the plate section detachably abuts against or neighbors on a surface of the frame body facing the panel main body, and a part of the rupturable portion with which the door section is defined and which is adjacent to the extreme end of the plate section is located outwardly of the extreme end of the plate section.

According to the inventive vehicle interior trim article, in a normal time during which the air bag device is not activated, the extreme end of the plate section abuts against or neighbors on the surface of the frame body facing the panel main body, and thus the plate section is supported at its both ends (base end and extreme end) by the frame body. As a result, the strength of the panel main body can be easily ensured such that the breakage of the panel main body is prevented even if a vehicle occupant, for example, has pressed the panel main body from the top side thereof.

Furthermore, since the plate section, the frame body and the hinge section are integrally formed, it becomes possible to reduce the number of components, and the number of steps for assembling the vehicle interior trim article during its fabrication. As a result, the fabrication efficiency can be improved and thus the fabrication cost can be reduced.

When the rupturable portion of the panel main body is ruptured to open the door section upon activation of the air bag device, the extreme end of the plate section is easily detached from the frame body. To be more specific, since the extreme end of the plate section detachably abuts against or neighbors on the surface of the frame body facing the panel main body, the extreme end of the plate section is easily detached from the frame body due to the inflation of the air bag, and a force produced by the inflation of the air bag is transmitted to the door section so that the door section is opened with certainty. In the vehicle interior trim article, the rupturable portion of the panel main body is located outwardly of the extreme end of the plate section, i.e., the extreme end of the plate section is located inwardly of the rupturable portion of the panel main body. Therefore, when the door section is opened, the extreme end of the plate section does not interfere with the panel main body, thus making it possible to smoothly open the door section.

In one embodiment of the interior trim article, the hinge section is preferably formed into an approximate U-shape in cross section which protrudes away from the panel main body within the frame body, and a part of the rupturable portion with which the door section is defined and which is adjacent to the hinge section is preferably formed at a portion of the panel main body facing an approximately U-shaped groove formed by the hinge section.

In such an embodiment, when the door section is opened, it becomes possible to prevent the hinge section from hitting against the rupturable portion of the panel main body, and thus it becomes possible to more smoothly open the door section.

The present invention also provides for a method for fabricating the air-bag-door-equipped vehicle interior trim article.

The inventive method is characterized by including: a step of integrally molding the plate section, the frame body and the hinge section so that the base end of the plate section is connected to the frame body via the hinge section, and the extreme end of the plate section is spaced apart from the surface of the frame body facing the panel main body by a predetermine distance; and a subsequent step of rotating the plate section around the hinge section so that the extreme end of the plate section abuts against or neighbors on the surface of the frame body facing the panel main body, and welding the plate section and the flange section of the frame body to the panel main body.

According to the inventive method, by rotating the plate section around the hinge section, it becomes possible to easily obtain the interior trim article in which the extreme end of the plate section detachably abuts against or neighbors on the surface of the frame body facing the panel main body. Further, by welding the plate section and the flange section of the frame body to the panel main body in this state, it becomes possible to easily fabricate the air-bag-door-equipped vehicle interior trim article.

Specifically, the present invention provides for a method for fabricating an air-bag-door-equipped vehicle interior trim article such as one described above. The method is characterized by including the steps of:

a) molding the frame body in which the tubular main section and the flange section are integrally formed, inserting the tubular main section of the frame body into a mold assembly, and injecting a resin material to the mold assembly, thereby integrally molding a leg section integrally formed with the tubular main section, the plate section, and the hinge section through which the plate section and the leg section are connected, such that the extreme end of the plate section is spaced apart from the surface of the frame body facing the panel main body by a predetermined distance; and b) rotating the plate section around the hinge section so that the extreme end of the plate section abuts against or neighbors on the surface of the frame body facing the panel main body, and welding the plate section and the flange section of the frame body to the panel main body, wherein the step b) is performed after the step a) has been performed.

According to the inventive method, the plate and hinge sections can be molded using a highly ductile resin material while the frame body can be molded using a resin material with a high strength. That is, the plate and hinge sections, and the frame body can be molded using different and suitable materials that allow the resulting plate and hinge sections and the resulting frame body to carry out their respective required functions. Consequently, the inventive method is advantageous in improving the quality and/or reliability of the vehicle interior trim article.

In order to increase the stiffness of the air bag door section of the vehicle interior trim article and reliably open the door section upon activation of the air bag device, the present invention provides for a vehicle interior trim article including: a base member; and a back-up member that includes a plate section and a back-up section having a shooting aperture, wherein a gap formed between the extreme end of the plate section and the outer edge of the shooting aperture associated with the extreme end when the back-up member is molded is wider than a gap formed therebetween after the plate section has been welded to the base member.

Besides, the present invention provides for a vehicle interior trim article including a back-up member integrally formed with front and rear plate sections, wherein a gap is formed between opposing extreme ends of the plate sections when the back-up member is molded, and the extreme ends are overlapped with each other after the plate sections have been welded to a base member.

To be more specific, the present invention provides for another air-bag-door-equipped vehicle interior trim article including: a base member having a door section defined with a door hinge part and a rupturable portion that is to be ruptured by inflation of an air bag; and a resin back-up member that is located on the bottom side of the base member and that includes a back-up section provided with a rectangular shooting aperture through which the air bag expands into a cabin, and a plate section for openably closing the shooting aperture.

The plate section is integrally molded with the back-up section via a plate-side hinge section located adjacent to the door hinge part.

The back-up member is provided with gaps each having a predetermined width and each formed between an end of the plate section and an outer edge of the shooting aperture except a portion of the back-up member at which the plate-side hinge section is provided.

The plate section is welded to the bottom face of the base member at a portion thereof located at the door section, while the back-up section is welded to the bottom face of the base member at a portion thereof located around the door section.

The interior trim article is characterized in that the back-up member is formed so that an extreme-end-side gap formed between the extreme end of the plate section and the outer edge of the shooting aperture associated with the extreme end is narrower than each lateral-end-side gap formed between the lateral end of the plate section and the outer edge of the shooting aperture associated with the lateral end.

According to the inventive vehicle interior trim article, the pressure receiving surface of the plate section to be pressed by the air bag can be enlarged at the extreme end of the plate section, and the stiffness of the door section can be increased. In addition, since a pressure for deploying the air bag does not directly act on the extreme-end-side gap, a crack is prevented from being produced in a part of the base member located around the rupturable portion adjacent to the extreme-end-side gap, and thus the door section can be opened with stability together with the plate section.

In one embodiment of the inventive interior trim article, the back-up member is preferably integrally formed with a cross-sectionally rectangular tubular section, extending opposite to the base member from the outer edge of the shooting aperture of the back-up section, for accommodating an air bag device. In such an embodiment, it is unnecessary to additionally provide a component for accommodating the air bag device, which contributes to a reduction in the number of components.

The plate section is preferably molded such that the extreme-end-side gap formed before the plate section is welded to the bottom face of the door section is wider than the extreme-end-side gap formed when the plate section has been welded to the bottom face of the door section, and then the plate section is preferably pressed toward the shooting aperture, rotated around the plate-side hinge section to form the extreme-end-side gap narrower than the lateral-end-side gap, and welded to the bottom face of the door section.

In this manner, the extreme-end-side gap can be narrower than the lateral-end-side gap with certainty. Besides, since the extreme-end-side gap can be wide when the back-up member is molded, it becomes possible to avoid the problem that the extreme end of the plate section is connected to the outer edge of the shooting aperture of the back-up section due to burrs. As a result, it becomes possible to minimize the width of the extreme-end-side gap formed when the back-up member has been welded to the base member.

The present invention further provides for another method for fabricating an air-bag-door-equipped vehicle interior trim article such as one described above. The method is characterized by including the steps of:

a) molding the back-up member such that a gap formed between the extreme end of the plate section and the outer edge of the shooting aperture associated with the extreme end is wider than the extreme-end-side gap to be formed when the plate section is welded to the bottom face of the door section; and b) pressing the plate section toward the shooting aperture and rotating the plate section around the plate-side hinge section to form the extreme-end-side gap narrower than the lateral-end-side gap, welding the plate section to the bottom face of the door section, and welding the back-up section to the bottom face of the base member at a portion thereof located around the door section, wherein the step b) is performed after the step a) has been performed.

According to the inventive method, when the back-up member is molded, the extreme end of the plate section is effectively prevented from being connected to the outer edge of the shooting aperture of the back-up section due to burrs, which leads to an increase in the yield of the back-up member and the efficient fabrication of the vehicle interior trim article.

The present invention further provides for still another air-bag-door-equipped vehicle interior trim article including a base member formed with a rupturable portion and a door hinge part that includes a front door hinge portion and a rear door hinge portion.

The rupturable portion and the door hinge part define a door section by surrounding a part of the base member.

The interior trim article is formed so that upon activation of an air bag device located to the bottom side of the door section, the rupturable portion is ruptured, the door section is opened while being rotated around the door hinge part, and an air bag expands into a cabin through an opening formed by the rupture.

The interior trim article is characterized in that the door section is divided into two door parts one in front of the other in a lengthwise direction of a vehicle, the front door part being rotatable around the front door hinge portion extended in a widthwise direction of the vehicle, the rear door part being rotatable around the rear door hinge portion extended in the widthwise direction of the vehicle, the interior trim article is provided with a back-up member including: a back-up section that is integrally welded to the bottom face of the base member at a portion thereof located around the door section, and that has a rectangular shooting aperture through which the air bag expands into the cabin upon activation of the air bag device; front and rear plate sections that are provided to close the shooting aperture and are welded to the bottom faces of the front and rear door parts, respectively; and plate-side hinge sections each provided adjacent to the corresponding one of the front and rear door hinge portions, and each connecting the corresponding one of the front and rear plate sections to the back-up section, the back-up section, the front and rear plate sections and the plate-side hinge sections are integrally formed, and opposing extreme ends of the front and rear plate sections detachably overlap with each other.

According to the inventive interior trim article, the back-up member is integrally formed with the front and rear plate sections. Therefore, it is unnecessary to separately mold the front and rear plate sections. As a result, it becomes possible to reduce the number of components, omit the step of attaching the molded plate sections to the back-up member, and simplify the step of assembling the vehicle interior trim article. Furthermore, according to the inventive interior trim article, the opposing extreme ends of both the plate sections are detachably overlapped with each other. As a result, the effect of reinforcing the door section can be improved, and upon activation of the air bag device, the plate sections can be easily separated from each other and thus the door section can be opened with stability.

In one embodiment of the inventive interior trim article, the extreme end of the rear plate section preferably overlies that of the front plate section.

In such an embodiment, even if a pressing force is applied on the rear plate section that is located in front of a vehicle occupant and is easily pressed by the occupant, the extreme end of the front plate section can receive the pressing force, thus dispersing the pressing force to both the plate sections. Besides, the plate sections each having a good stiffness can be inexpensively fabricated without increasing the thicknesses of the front and rear plate sections or using a stiff and expensive material.

In addition, the extreme end of the rear plate section located in front of the occupant overlies the extreme end of the front plate section. Therefore, when the air bag expands into the cabin, the rear plate section opens before the front plate section opens. As a result, it becomes possible to further ensure the safety of the occupant.

The present invention further provides for still another method for fabricating an air-bag-door-equipped vehicle interior trim article such as one described above. The method is characterized by including the steps of:

a) molding the back-up member so that a gap is formed between the extreme end of the front plate section and that of the rear plate section; and b) pressing at least one of the front and rear plate sections toward the shooting aperture and rotating the plate section around the plate-side hinge section to weld the front and rear plate sections to the bottom faces of the front and rear door parts, respectively, and welding the back-up section to the bottom face of the base member at a portion thereof located around the door section.

Generally, it is difficult to mold the back-up member in which the extreme ends of the front and rear plate sections are overlapped each other. Therefore, according to the present invention, the back-up member is molded so that a gap is formed between the extreme ends of both the plate sections, and then the extreme ends of both the plate sections are overlapped by rotating at least one of the plate sections when the plate sections are welded to the base member. Accordingly, both the plate sections can be integrally formed with the back-up section. As a result, the back-up member in which the extreme ends of both the plate sections are overlapped with each other can be obtained with ease and certainty, and thus the vehicle interior trim article can be inexpensively fabricated.

DESCRIPTION OF THE PREFERRED EMBODIMENTS

Hereinafter, preferred embodiments of the present invention will be described in detail with reference to the accompanying drawings.

<Embodiment 1>

Figure 1:
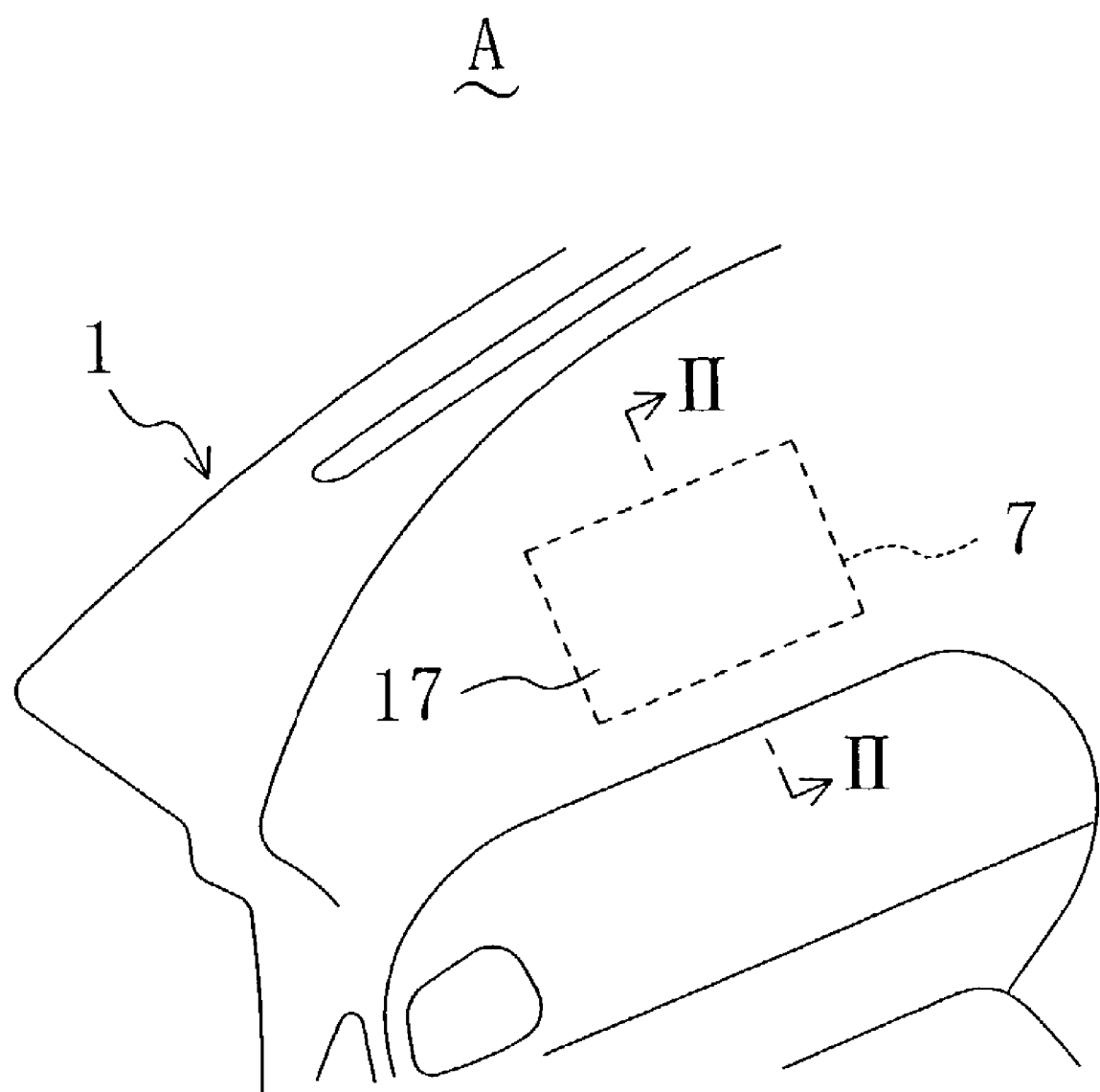
FIG. 1 is a perspective view partially showing the main body of an instrument panel including an air bag door according to Embodiment 1 of the present invention.
Figure 2:
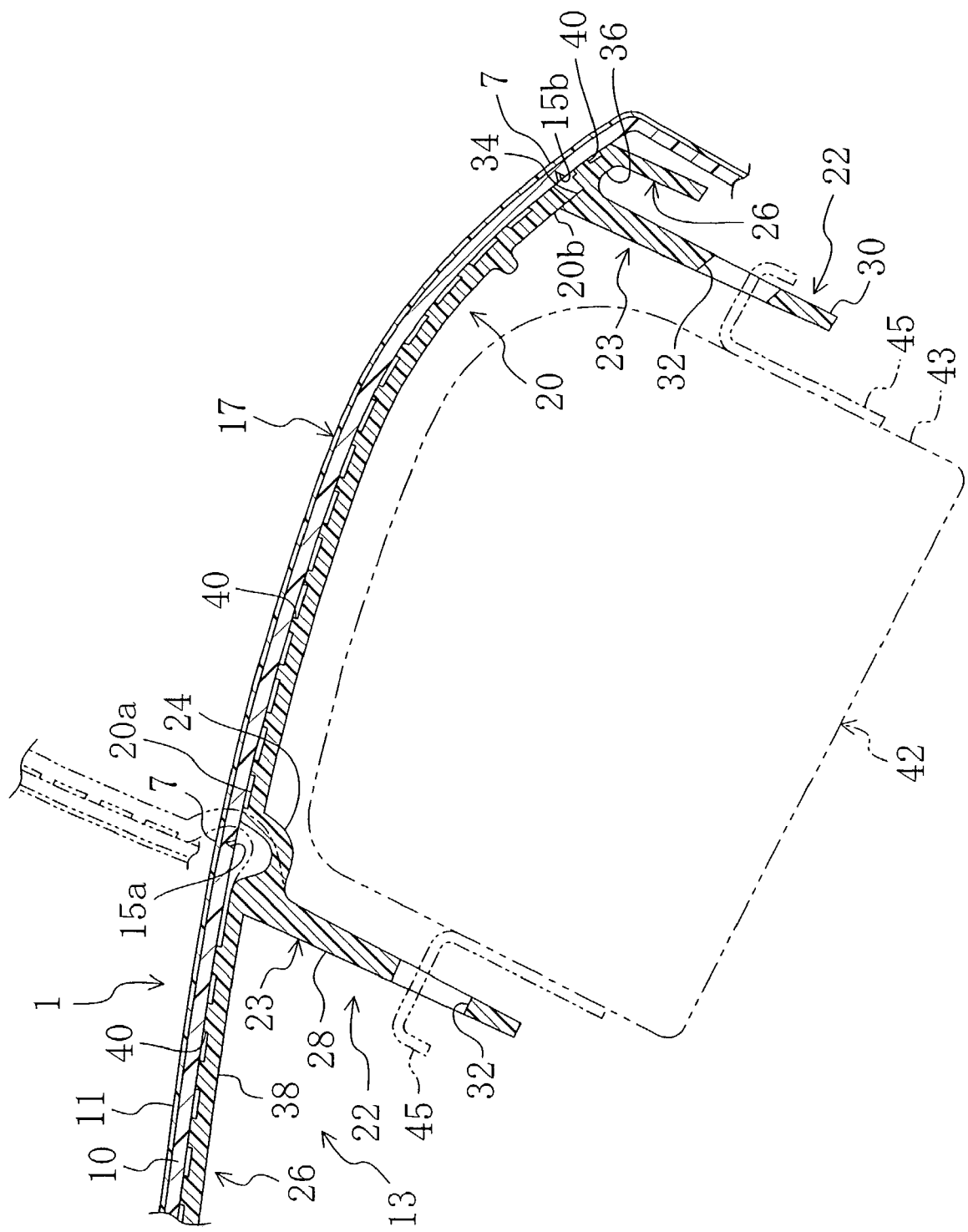
FIG. 2 is a cross-sectional view taken along the line II—II in FIG. 1.

FIG. 1 partially shows a main body (panel main body) 1 of an instrument panel (vehicle interior trim article) A disposed at the front section of an automobile cabin. The panel main body 1 is provided with a rectangular air bag door (door section) 17. To be more specific, the door section 17 is provided at a portion of the panel main body 1 located in front of a passenger's seat adjacent to a driver's seat. The door section 17 is defined with a rupturable portion 7 that is to be ruptured when an air bag (not shown) of an air bag device 42 shown in FIG. 2 is deployed, and the door section 17 is of a so-called seamless type in which the rupturable portion 7 cannot be recognized from the top side of the panel main body 1. The air bag device 42 serves to protect an occupant in the passenger's seat from shock applied in a lengthwise direction of the automobile.

As shown in FIG. 2, the panel main body 1 includes: a resin base member 10 provided by injection molding thermo plastic olefin (TPO), for example; and a skin member 11 integrally connected to the base member 10 at the top side thereof The base member 10 is provided at its bottom face with grooves 15a and 15b each recessed toward the top face of the base member 10, and forming the corresponding sides of the rectangular door section 17. In other words, a portion of the panel main body 1 at which the grooves 15a and 15b are provided constitutes a fragile portion that is thinner than the other portion of the panel main body 1, and this thin and fragile portion functions as the rupturable portion 7. And the rupturable portion 7 forms an outer edge of the rectangular door section 17 that is opened toward the front of the vehicle, The panel main body 1 is further provided at its bottom side with a molded resin member 13. The molded resin member 13 includes: a back-up plate (reinforcing plate section) 20 that extends along the door section 17, that is integrally connected to the door section 17 at the bottom face thereof, and that includes a base end 20a and an extreme end 20b; a frame body 22 provided in connection with the back-up plate 20; and a hinge section 24 through which the base end 20a of the back-up plate 20 is connected to the frame body 22. The back-up plate 20, frame body 22 and hinge section 24 are integrally molded.

The frame body 22 includes: a cross-sectionally rectangular tubular section (tubular main section) 23 extending away from the panel main body 1; and a flange section 26 extending outward from an outer end of the tubular section 23 located closer to the panel main body 1.

The tubular section 23 includes: a hinge-side portion 28 integrally connected to the hinge section 24; and a plate-extreme-end-side portion 30 opposite to the hinge-side portion 28. The tubular section 23 is provided at its intermediate portion with a plurality of elongated holes 32 each passing though the tubular section 23 in a thickness direction thereof.

The flange section 26 at least includes: an extreme-end-side flange part 36 connected to the plate-extreme-end-side portion 30 of the tubular section 23; and a base-end-side flange part 38 connected to the hinge-side portion 28 of the tubular section 23. The flange section 26 is welded to the bottom face of the base member 10 at a portion thereof located around the door section 17, i.e., around the rupturable portion 7. The extreme-end-side flange part 36 extends from a portion of flange section 26 adjacent to the outer edge of the door section 17, and extends outward therefrom along the base member 10 on a line extending from the back-up plate 20. And the outer end of the extreme-end-side flange part 36 is bended away from the panel main body 1. On the other hand, the base-end-side flange part 38 extends in the direction opposite to that in which the extreme-end-side flange part 36 extends, along the base member 10 on a line extending from the back-up plate 20.

The back-up plate 20 is formed into a plate-like shape extending along the bottom face of the base member 10 and having a size substantially corresponding to that of the door section 17. The base end 20a of the back-up plate 20 is integrally connected to the frame body 22 via the hinge section 24.

In the tubular section 23, a top-side end face (a stepped face opposite to the panel main body 1) 34 is provided at least at an end of the plate-extreme-end-side portion 30 located closer to the panel main body 1. The top-side end face 34 is located at a lower level than the top face of the flange section 26 by the thickness of the back-up plate 20. And the extreme end 20b of the back-up plate 20 detachably abuts against the top-side end face 34.

In other words, the top-side end face 34 at the plate-extreme-end-side portion 30 of the tubular section 23 is formed to extend substantially parallel to the bottom face of the base member 10, and the extreme end 20b of the back-up plate 20 is located over the top-side end face 34 (which is opposite to the panel main body 1). As will be described later, the back-up plate 20 is downwardly rotated around the hinge section 24 by applying a pressure on the base member 10 from the top side of the panel. And in this state, the back-up plate 20 is welded and connected to the base member 10, and the extreme end 20b of the back-up plate 20 abuts against the top-side end face 34 of the plate-extreme-end-side portion 30.

Alternatively, the extreme end 20b of the back-up plate 20 may be allowed to neighbor on the top-side end face 34 of the plate-extreme-end-side portion 30 of the tubular section 23, instead of allowing the extreme end 20b to abut against the top-side end face 34. In such an arrangement, even if an external force is applied from the top side of the panel main body 1, the stiffness of the back-up plate 20 as a back-up means is ensured because the extreme end 20b thereof is still allowed to abut against the top-side end face 34 and supported thereto.

The hinge section 24 is formed into an approximate U-shape in cross section which protrudes away from the bottom side of the panel main body 1 within the tubular section 23, and furthermore, the hinge section 24 extends along the entire length of the side of the rectangular door section 17 closer to the front of the vehicle. In this state, the hinge section 24 connects the base end 20a of the back-up plate 20 to an end of the hinge-side portion 28 of the tubular section 23 located closer to the panel main body 1.

The groove 15a that is closer to the hinge section 24 and forms a part of the rupturable portion 7 is provided at a portion of the base member 10 of the panel main body 1 facing an approximately U-shaped groove formed by the hinge section 24. In other words, the groove 15a is located outwardly of a junction of the back-up plate 20 and the hinge section 24. Since the hinge section 24 is formed into an approximate U-shape in cross section, the hinge section 24 is prevented from interfering with the panel main body 1 when the door section 17 opens. On the other hand, the groove 15b that is closer to the extreme end of the plate and forms another part of the rupturable portion 7 is located outwardly of the extreme end 20b of the back-up plate 20.

The back-up plate 20 and flange section 26 are provided at their top sides with a plurality of weld protrusions 40 spaced a certain distance apart. The extreme ends of the weld protrusions 40 are vibration welded to the base member 10, thus connecting the back-up plate 20 and flange section 26 to the base member 10.

The air bag device 42 is provided within the frame body 22. The air bag device 42 includes an air bag case 43 for accommodating the air bag and an inflator (not shown). The air bag case 43 is provided with hooklike fittings 45 fixed thereto, and is hooked to the tubular section 23 with the fittings 45 inserted through the elongated holes 32. The air bag in a folded state is housed in the air bag case 43, and the inflator generates gas upon detection of the shock applied on the vehicle. Due to the gas generated by the activation of the inflator, the air bag is inflated and deployed. It should be noted that a portion of the panel main body 1 at the left side of FIG. 2 is located closer to the front of the vehicle, i.e., closer to the windshield of the vehicle, while a portion of the panel main body 1 at the right side of FIG. 2 is located closer to the rear of the vehicle, i.e., closer to the passenger's seat.

Method for Fabricating Vehicle Interior Trim Article

Figure 3:
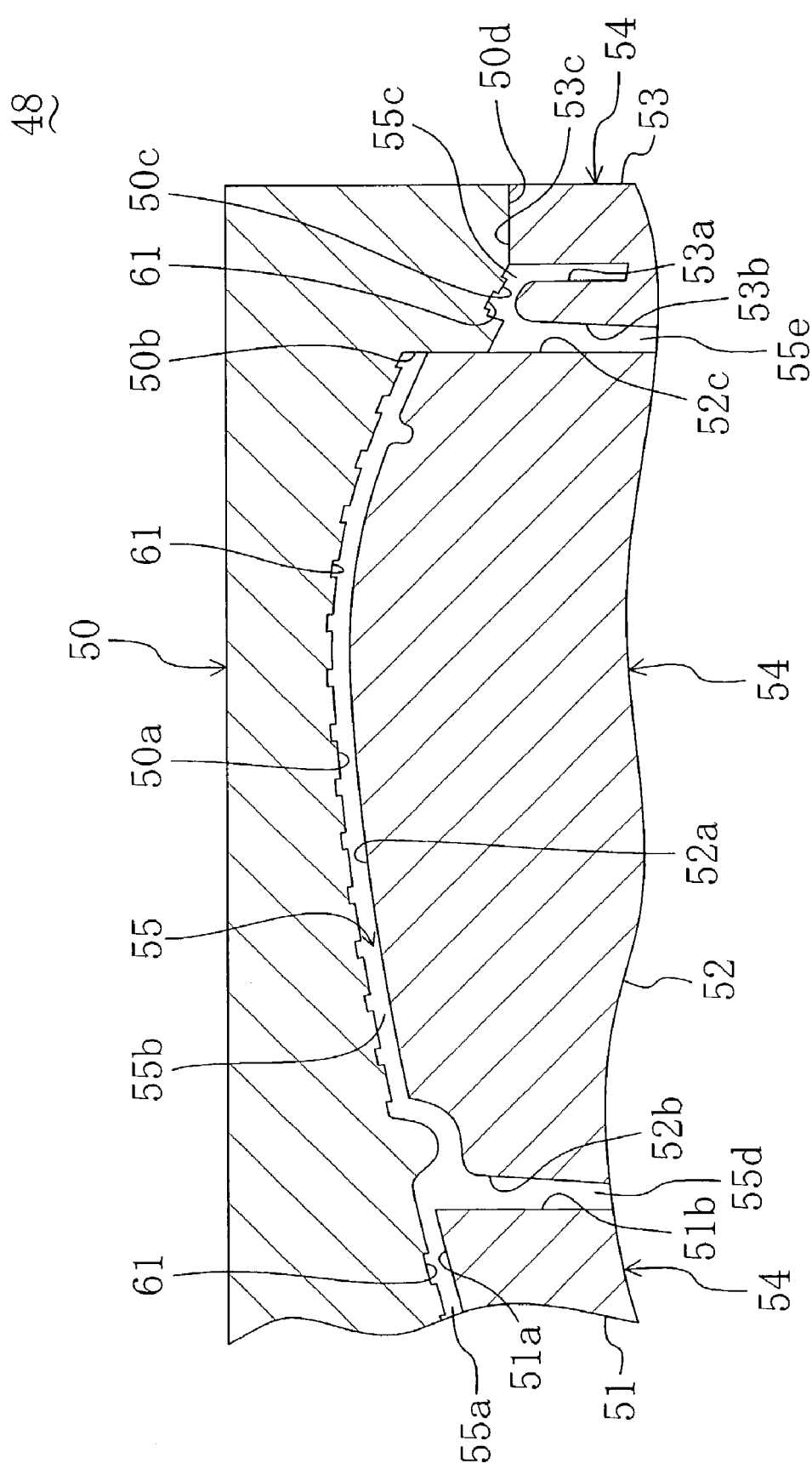
FIG. 3 is a cross-sectional view of a mold assembly for molding a back-up plate, a tubular section and a hinge section.

Hereinafter, a method for fabricating the vehicle interior trim article will be described. First, a mold assembly for use in fabricating the vehicle interior trim article is described below. FIG. 3 shows a mold assembly 48 for providing the molded resin member 13. The mold assembly 48 includes a first die 50 and a second die 54. The second die 54 includes a base-end-side section 51, a plate-bottom-side section 52 and an extreme-end-side section 53 that are integrally formed.

A cavity 55 formed between the first and second dies 50 and 54 includes first through fifth cavity portions 55a through 55e. The first cavity portion 55a is formed between the first die 50 and the base-end-side section 51 of the second die 54, and is associated with the base-end-side flange part 38 of the flange section 26. The second cavity portion 55b is formed between the first die 50 and the plate-bottom-side section 52 of the second die 54, and is associated with the back-up plate 20 and hinge section 24. The third cavity portion 55c is formed between the first die 50 and the extreme-end-side section 53 of the second die 54, and is associated with the extreme-end-side flange part 36 of the flange section 26. The fourth cavity portion 55d is formed between the base-end-side section 51 of the second die 54 and the plate-bottom-side section 52 of the second die 54, and is associated with the hinge-side portion 28 of the tubular section 23. And the fifth cavity portion 55e is formed between the plate-bottom-side section 52 of the second die 54 and the extreme-end-side section 53 of the second die 54, and is associated with the plate-extreme-end-side portion 30 of the tubular section 23. Since the first through fifth cavity portions 55a through 55e are communicated with each other, the back-up plate 20, frame body 22 and hinge section 24 can be integrally molded.

The first die 50 includes: a first molding surface 50a facing the first and second cavity portions 55a and 55b; a first mold sliding surface 50b extending in a die sliding direction (as used herein, "die sliding direction" refers to a direction in which a die slides); a second molding surface 50c facing the third cavity portion 55c; and an abutting surface 50d that abuts against the extreme-end-side section 53 of the second die 54. The first molding surface 50a is located at a higher level than the second molding surface 50c by a predetermined height in the first die 50. Thus, a line extended from the second cavity portion 55b is deviated from the third cavity portion 55c by a predetermined distance. The first and second molding surfaces 50a and 50c are formed with a plurality of recesses 61 spaced a certain distance apart. The recesses 61 are provided to form the weld protrusions 40 at the back-up plate 20 and flange section 26.

The plate-bottom-side section 52 includes: a first molding surface 52a facing the second cavity portion 55b; a second molding surface 52b that extends in a die sliding direction and faces the fourth cavity portion 55d; and a third molding surface 52c that extends in a die sliding direction and partially faces the fifth cavity portion 55e. The third molding surface 52c is partially in contact with the first mold sliding surface 50b during resin injection. Therefore, in this case, the second and fifth cavity portions 55b and 55e are not communicated with each other. Accordingly, the extreme end 20b of the back-up plate 20 (which is to be molded by the second cavity portion 55b) and the plate-extreme-end-side portion 30 of the tubular section 23 (which is to be molded by the fifth cavity portion 55e) are molded such that the extreme end 20b and the plate-extreme-end-side portion 30 are spaced apart from each other.

The base-end-side section 51 includes: a first molding surface 51a facing the first cavity portion 55a; and a second molding surface 51b facing the fourth cavity portion 55d. On the other hand, the extreme-end-side section 53 includes: a first molding surface 53a facing the third cavity portion 55c; a second molding surface 53b facing the fifth cavity portion 55e; and an abutting surface 53c that abuts against the abutting surface 50d of the first die 50.

Described below is how the vehicle interior trim article is fabricated using the mold assembly 48 formed as described above. First, molten resin is injected into the cavity 55 of the mold assembly 48. After the molten resin has been solidified, the first and second dies 50 and 54 are opened to demold the molded resin member 13. In this manner, the molded resin member 13 is formed such that the extreme end 20b of the back-up plate 20 is located at a higher level than the top-side end face 34 of the plate-extreme-end-side portion 30 of the tubular section 23 by a predetermined distance.

Subsequently, the back-up plate 20 and flange section 26 of the molded resin member 13 are vibration welded, at top sides thereof, to the base member 10. During the welding, the base member 10 is pressed against the top side of the back-up plate 20, thereby rotating the back-up plate 20 downward around the hinge section 24 until the extreme end 20b of the back-up plate 20 abuts against or neighbors on the top-side end face 34 of the plate-extreme-end-side portion 30 of the tubular section 23. In this state, the back-up plate 20 and flange section 26 are welded to the base member 10. Accordingly, it becomes possible to provide the molded resin member 13 in which the extreme end 20b of the back-up plate 20 is allowed to detachably abut against the top-side end face 34 of the plate-extreme-end-side portion 30. Then, the base member 10 is covered with the skin member 11. As a result, the instrument panel A (vehicle interior trim article) is fabricated.

According to the present embodiment, in a normal time during which the air bag device 42 is not activated, both the ends (base end 20a and extreme end 20b) of the back-up plate 20 are supported on the frame body 22 because the extreme end 20b of the back-up plate 20 abuts against the top-side end face 34 of the plate-extreme-end-side portion 30 of the tubular section 23. Therefore, the door section 17 will not be broken even if the vehicle occupant, for example, presses the panel main body 1. That is, the strength of the door section 17 can be ensured with ease.

Furthermore, since the back-up plate 20 and the frame body 22 are integrally formed via the hinge section 24, it becomes possible to reduce not only the number of components but also the number of steps for assembling the air bag door (door section) 17 during its fabrication. As a result, it becomes possible to increase the fabrication efficiency and to reduce the fabrication cost.

When the rupturable portion 7 of the panel main body 1 is ruptured due to activation of the air bag device 42 and the door section 17 is rotated around the hinge section 24 and opened, the extreme end 20b of the back-up plate 20 is detached from the top-side end face 34 of the plate-extreme-end-side portion 30. This is because the molded resin member 13 is formed so that the extreme end 20b of the back-up plate 20 can be detached from the top-side end face 34 of the plate-extreme-end-side portion 30. Therefore, when the door section 17 opens, the back-up plate 20 can be easily detached from the top-side end face 34 of the frame body 22, and thus the door section 17 can be opened with stability.

Besides, since a part of the rupturable portion 7 adjacent to the extreme end 20b is located outwardly of the extreme end 20b of the back-up plate 20, the extreme end 20b does not interfere with the panel main body 1 when the door section 17 opens. In other words, since the extreme end 20b of the back-up plate 20 is located inwardly of the part of the rupturable portion 7 of the panel main body 1 adjacent to the extreme end 20b, the back-up plate 20 does not interfere with the panel main body 1 when the door section 17 opens. In addition, the hinge section 24 does not hit against the rupturable portion of the panel main body 1 when the door section 17 opens. This is because the hinge section 24 is formed into an approximate U-shape in cross section which protrudes from the bottom side of the door section 17 while a part of the rupturable portion 7 adjacent to the hinge section 24 is provided directly above the hinge section 24. In such an arrangement, the door section 17 can be smoothly opened upon activation of the air bag device 42.

When the back-up plate 20, frame body 22 and hinge section 24 are molded, the base end 20a of the back-up plate 20 is integrally formed with the hinge-side portion 28 of the tubular section 23 via the hinge section 24, and the back-up plate 20 is molded so that the extreme end 20b thereof is spaced upwardly apart from the top-side end face 34 of the plate-extreme-end-side portion 30 by a predetermined distance. As a result, by rotating the back-up plate 20 around the hinge section 24 after the molding, it becomes possible to easily obtain the back-up plate 20 and frame body 22 in which the extreme end 20b of the back-up plate 20 detachably abuts against the top-side end face 34 of the plate-extreme-end-side portion 30. Furthermore, if the back-up plate 20 is welded to the panel main body 1 in this state, the extreme end 20b can be easily detached from the plate-extreme-end-side portion 30 of the tubular section 23, although the base end 20a of the back-up plate 20 is integrally formed with the hinge-side portion 28 of the tubular section 23.

<Embodiment 2>

Figure 4:
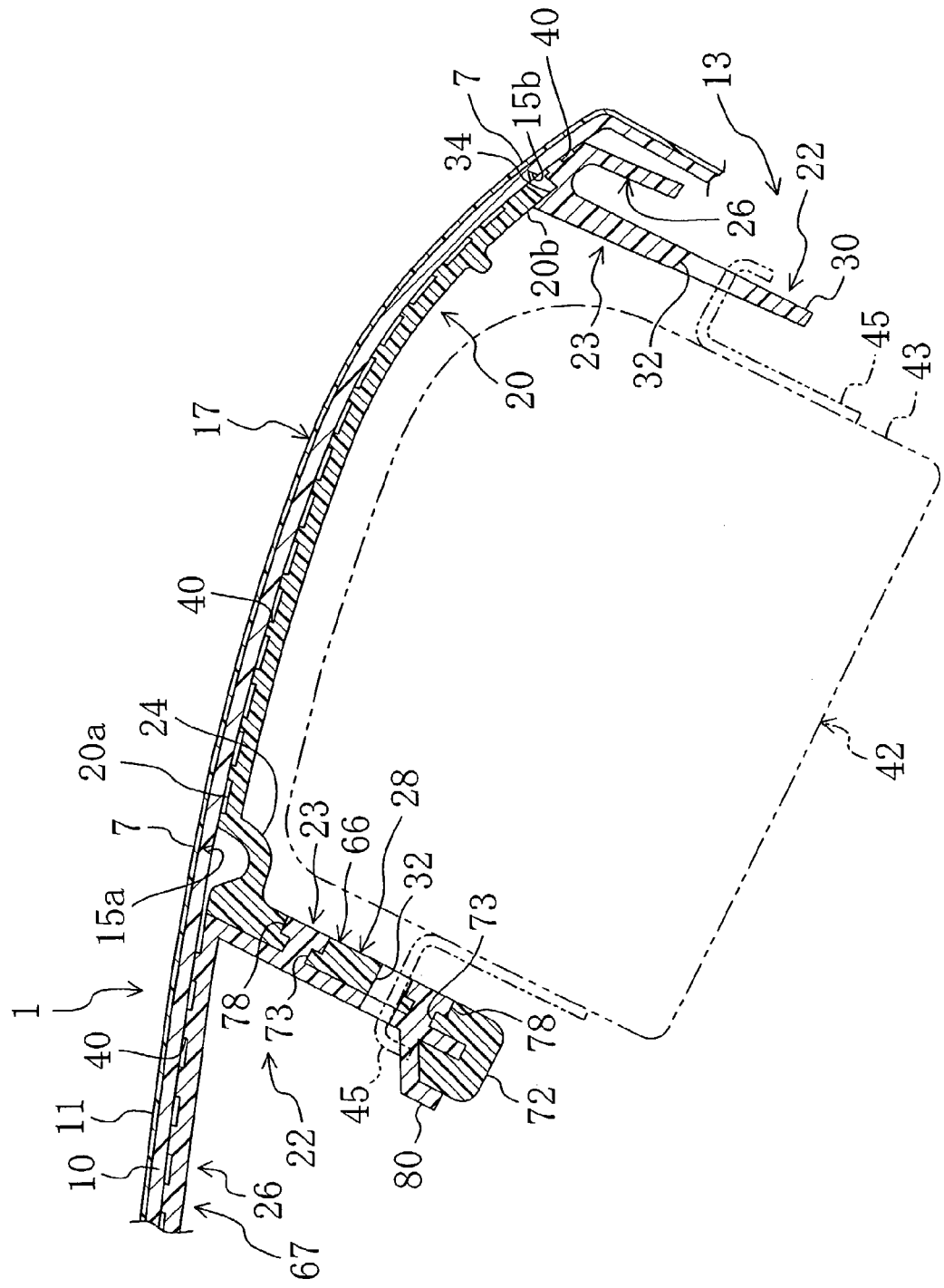
FIG. 4 is a cross-sectional view of the main body of an instrument panel according to Embodiment 2 of the present invention.

According to Embodiment 2 of the present invention, as shown in FIG. 4, a panel main body 1 includes a molded resin member 13 formed by: a first molded part 66 made up of a back-up plate 20 including a base end 20a and an extreme end 20b, a leg section 28, and a hinge section 24 through which the base end 20a of the back-up plate 20 is connected to the leg section 28; and a second molded part 67 made up of a tubular section 23, and a flange section 26 extending outward from the tubular section 23. The first molded part 66 is made of a first resin material, while the second molded part 67 is made of a second resin material.

In this embodiment, the same elements are identified by the same reference characters as those used in Embodiment 1, and the description thereof will be omitted.

In Embodiment 2, a so-called dual injection molding technique is applied as follows. First, the second resin material is injected to mold the second molded part 67 made up of the tubular section 23 and the flange section 26. Thereafter, the tubular section 23 of the second molded part 67 is inserted into a mold assembly for providing the first molded part 66, and the first resin material is injected to the mold assembly, thereby providing the first molded part 66 that is made up of the leg section 28, back-up plate 20 and hinge section 24, the leg section 28 being integrally formed with the tubular section 23. That is, in Embodiment 2, the back-up plate 20, frame body 22 (which includes the tubular section 23 and the flange section 26), and hinge section 24 are also integrally formed.

In this case, the first molded part 66 is integrally molded so that the extreme end 20b of the back-up plate 20 is spaced apart from a surface (top-side end face 34) of the frame body 22 facing the panel main body 1 by a predetermined distance. Thereafter, the back-up plate 20 is rotated around the hinge section 24 so that the extreme end 20b of the back-up plate 20 abuts against or neighbors on the surface of the frame body 22 facing the panel main body 1, and the back-up plate 20 and the flange section 26 of the frame body 22 are welded to the panel main body 1.

A lower end 72 of the leg section 28 is formed into an approximate U-shape bending outward from the tubular section 23. The leg section 28 is provided with a plurality of elongated holes 32 for use in hooking an air bag case 43, and a plurality of fixture holes 73 each passing through the leg section 28 in a thickness direction thereof. Each fixture hole 73 is formed into a stepped shape in which the area thereof at an internal portion of the tubular section 23 is enlarged.

The tubular section 23 of the second molded part 67 is provided, at portions thereof adjacent to the leg section 28, with a plurality of inward protrusions 78 each protruding inward, and an outward protrusion 80 protruding outward. The plurality of inward protrusions 78 are each formed within the associated fixture hole 73 of the leg section 28. An end of the tubular section 23 adjacent to the leg section 28 is molded within the approximately U-shaped lower end 72 of the leg section 28.

Accordingly, in Embodiment 2, in a normal time during which an air bag device 42 is not activated, both the ends (base end 20a and extreme end 20b) of the back-up plate 20 are supported on the frame body 22 because the extreme end 20b of the back-up plate 20 abuts against the top-side end face 34 at a plate-extreme-end-side portion 30 of the tubular section 23. As a result, the strength of the panel main body 1 can be easily ensured such that it will not be broken even if a vehicle occupant, for example, presses the panel main body 1.

Alternatively, the extreme end 20b of the back-up plate 20 may be allowed to neighbor on the top-side end face 34 of the tubular section 23 instead of letting the extreme end 20b abut against the top-side end face 34 of the plate-extreme-end-side portion 30. In such an arrangement, even if an external force is applied from the top side of the panel main body 1, the stiffness of the back-up plate 20 can be ensured since the extreme end 20b of the back-up plate 20 is still allowed to abut against the top-side end face 34 of the plate-extreme-end-side portion 30.

Besides, in the present embodiment, different materials are used to form the first and second molded parts 66 and 67. Therefore, if the materials to be used are selected according to purposes, the obtained first and second molded parts 66 and 67 can effectively carry out their respective functions. For example, a ductile resin material that is unlikely to scatter when the door section 17 opens may be used to form the first molded part 66, while a resin material with a higher strength may be used to form the second molded part 67. However, in the present embodiment, the first and second molded parts 66 and 67 do not have to be formed using two different resin materials but may be formed using one and the same material.

As for other points, the vehicle interior trim article of the present embodiment is formed in the same way as in Embodiment 1, and thus achieves the same effects as in Embodiment 1.

<Embodiment 3>

Figure 5:
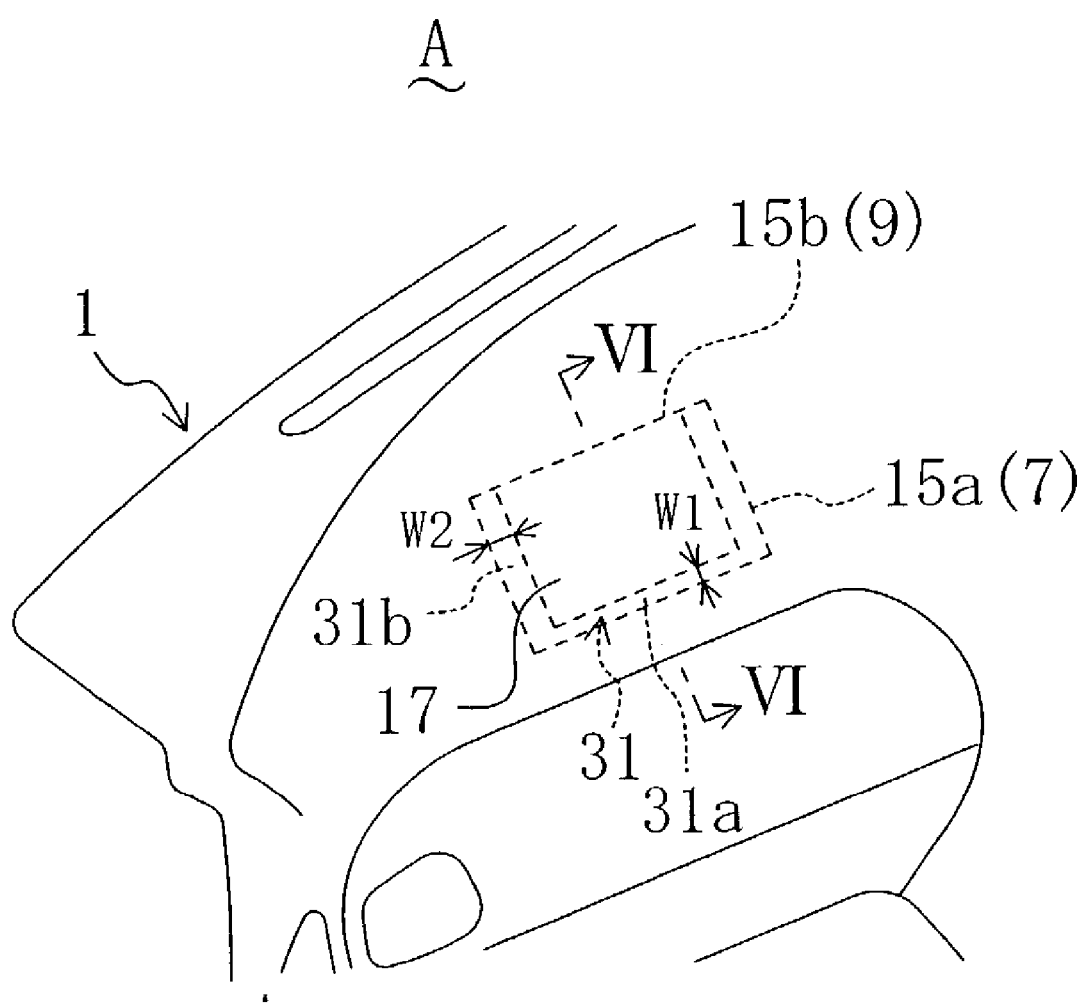
FIG. 5 is a perspective view partially showing the main body of an instrument panel including an air bag door according to Embodiment 3 of the present invention.

FIG. 5 partially shows a panel main body 1 of an instrument panel A as an air-bag-door-equipped vehicle interior trim article provided at the front section of a cabin of a vehicle. The panel main body 1 is provided, at a portion thereof located in front of a passenger's seat, with an air bag door section (door section) 17. The air bag door section 17 is defined with a rupturable portion 7 that is ruptured upon deployment of an air bag (not shown) as will be described later, and the door section 17 is of a so-called seamless type in which the rupturable portion 7 cannot be recognized from the top side of the panel main body 1.

Figure 6:
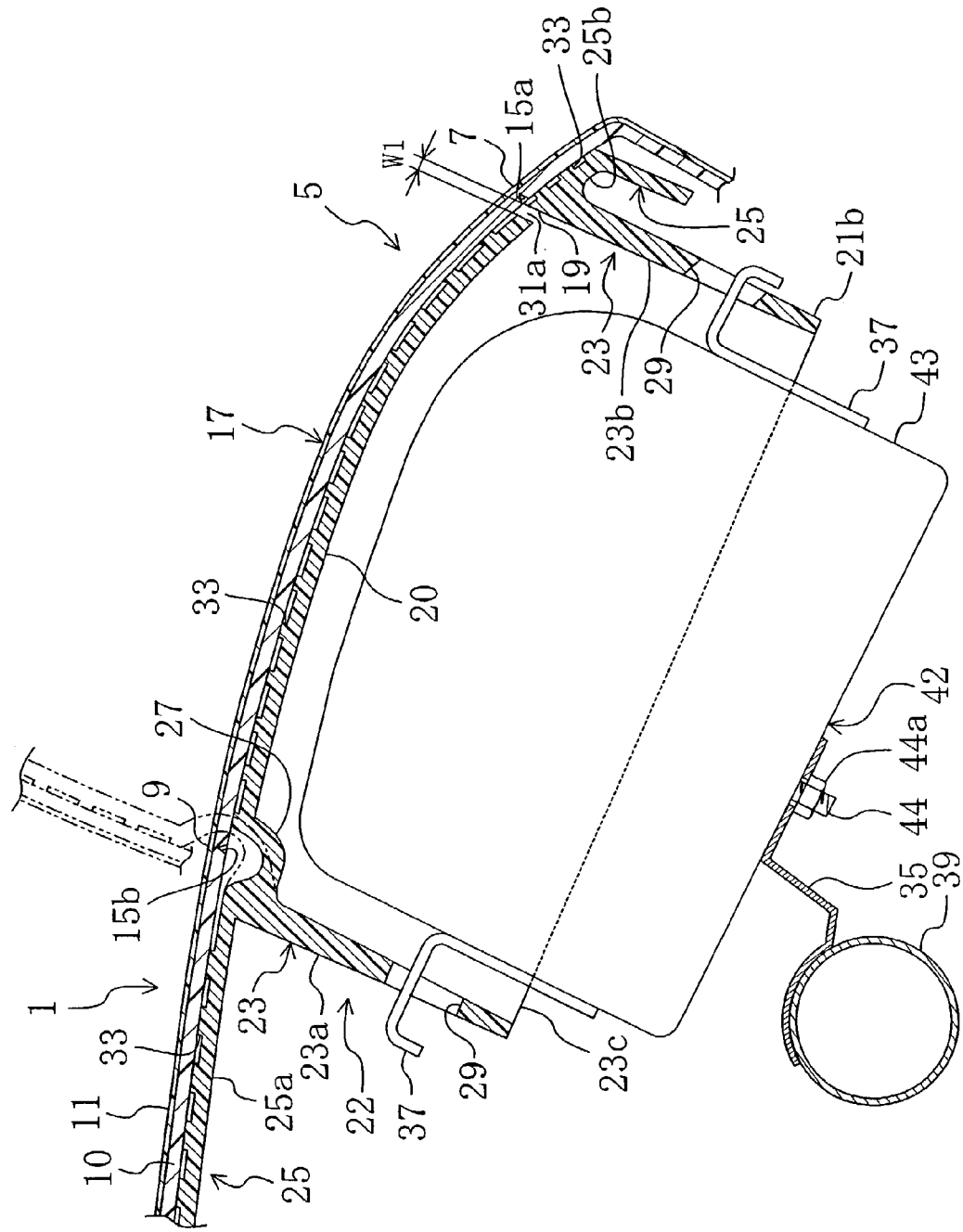
FIG. 6 is a cross-sectional view taken along the line VI—VI in FIG. 5.

As shown in FIG. 6, the panel main body 1 includes: a resin base member 10 provided by injection molding thermo plastic olefin (TPO), for example; and a resin skin member 11 integrally connected to the top side of the base member 10. It should be noted that a portion of the panel main body 1 at the left side of FIG. 6 is located closer to the front of the vehicle, i.e., closer to the windshield of the vehicle, while a portion of the panel main body 1 at the right side of FIG. 6 is closer to the rear of the vehicle, i.e., closer to a passenger's seat of the vehicle.

The base member 10 is provided at its bottom face with a first groove 15a recessed toward the top face of the base member 10, and a second groove 15b that is recessed toward the top face of the base member 10 and has a depth shallower than that of the first groove 15a. The first groove 15a is formed into a U-shape that is opened toward the front of the vehicle, while the second groove 15b is extended in a width direction of the vehicle so as to connect with extreme ends of the first groove 15a. Thus, the first and second grooves 15a and 15b form the corresponding sides of the rectangular door section 17.

In other words, a portion of the panel main body 1 at which the groove 15a is provided constitutes a fragile portion that is thinner than the other portions of the panel main body 1, and this thin and fragile portion functions as the rupturable portion 7. Furthermore, a thin portion of the panel main body 1 at which the second groove 15b is provided constitutes a door hinge part 9. The door hinge part 9 is thicker than the rupturable portion 7. And the rupturable portion 7 and door hinge part 9 form an outer edge of the rectangular door section 17 that is to be opened (rotated) toward the front of the vehicle.

On the bottom side of the base member 10 of the panel main body 1, a back-up member 22 is provided. The back-up member 22 is formed by a molded resin member, and includes: a back-up section 25 that is provided with a substantially rectangular shooting aperture 19 through which the air bag expands into the cabin, and that is formed to extend along the base member 10 at a portion thereof located around the door section 17; and a reinforcing plate section 20 which includes a base end, an extreme end and lateral ends, which is located within the shooting aperture 19 so that a gap 31 having a predetermined width is formed between the plate section 20 and an inner edge of the back-up section 25, and which is formed to extend along the door section 17. The base end of the plate section 20, located within the shooting aperture 19, is connected to the back-up section 25 via a plate-side hinge section 27.

The plate section 20 is formed into a plate-like shape having a size substantially corresponding to that of the door section 17. The gap 31 includes an extreme-end-side gap 31a and lateral-end-side gaps 31b. The extreme-end-side gap 31a is formed between the extreme end of the plate section 20 extended from the plate-side hinge section 27, and an outer edge of the shooting aperture 19 associated with the extreme end. The width W1 of the extreme-end-side gap 31a is minimized such that the width W1 is in the range of 0.5 mm to 2 mm, for example. On the other hand, the lateral-end-side gaps 31b are formed between lateral ends of the plate section 20 that are extended from both the longitudinal ends of the plate-side hinge section 27, and outer edges of the shooting aperture 19 associated with the lateral ends. The width W2 of each lateral-end-side gap 31b is wider than the width W1 (see FIG. 5). In other words, the width W1 of the extreme-end-side gap 31a is narrower than the width W2 of each lateral-end-side gap W2. The difference between the width W1 and the width W2 is made by carrying out the molding of the back-up member 22 in a manner described later.

The back-up section 25, provided on the bottom side of the base member 10 at a portion thereof located around the door section 17, includes: a base-end-side portion 25a located closer to the front of the vehicle than the shooting aperture 19; an extreme-end-side portion 25b located closer to the rear of the vehicle than the shooting aperture 19; and right and left lateral portions (not shown) that are located on both sides of the shooting aperture 19 in a widthwise direction of the vehicle, and that connect the base-end-side portion 25a and the extreme-end-side portion 25b to each other. The base-end-side portion 25a, extreme-end-side portion 25b and right and left lateral portions of the back-up section 25 are each provided to extend along the base member 10 on a plane extending from the plate section 20, and an outer end of the extreme-end-side portion 25b is bended away from the panel main body 1.

The plate section 20 and the back-up section 25 are provided, at top faces thereof (i.e., at faces thereof facing the panel main body 1), with a plurality of weld protrusions 33 that are spaced a certain distance apart. Through these weld protrusions 33, the top side of the plate section 20 is welded to the bottom side of the base member 10 at a portion thereof located at the door section 17, and the top side of the back-up section 25 is welded to the bottom side of the base member 10 at a portion thereof located around the door section 17. As will be described later, the plate section 20 and the back-up section 25 are vibration welded to the base member 10 by pressing the base member 10 against the top sides of the plate section 20 and the back-up section 25.

The plate-side hinge section 27 extends along the entire length of a side of the rectangular door section 17 located closer to the front of the vehicle, and is connected with the base-end-side portion 25a of the back-up section 25 and the base end of the plate section 20. The plate-side hinge section 27 is formed into an approximate U-shape in cross section which is bended to form a space between the plate-side hinge section 27 and the panel main body 1. Furthermore, the second groove 15b is formed in the base member 10 so that the second groove 15b faces the plate-side hinge section 27, thus preventing the plate-side hinge section 27 to interfere with the panel main body 1 when the door section 17 opens.

A part of the first groove 15a closer to the extreme end of the plate section 20 is located adjacent to the extreme-end-side gap 31a, while parts of the first groove 15a closer to the lateral ends of the plate section 20 are located adjacent to the lateral-end-side gaps 31b. Thus, when a pressure is applied on the plate section 20 to deploy the air bag, the rupturable portion 7 can be immediately ruptured.

The back-up member 22 is formed with a cross-sectionally rectangular tubular section 23 that is extended away from the panel main body 1 and that is provided at its upper end with the shooting aperture 19. The plate section 20, back-up section 25, plate-side hinge section 27 and tubular section 23 are integrally formed by injection molding.

The tubular section 23 includes: a base-end-side portion 23a that is integrally connected to the base-end-side portion 25a of the back-up section 25, and that is extended in the widthwise direction of the vehicle; an extreme-end-side portion 23b that is opposite to the base-end-side portion 23a, and that is extended in the widthwise direction of the vehicle; and a pair of right and left lateral portions 23c and 23c that extends in a lengthwise direction of the vehicle and connects both the ends of the base-end-side portion 23a to both the ends of the extreme-end-side portion 23b. The tubular section 23 is further provided at its intermediate portion with a plurality of elongated holes 29 passing through the tubular section 23 in its thickness direction.

Housed within the tubular section 23 is an air bag device 42 for protecting an occupant in the passenger's seat from the shock applied in the lengthwise direction of the vehicle. The air bag device 42 includes an air bag case 43 for accommodating the air bag and an inflator (not shown). The air bag case 43 is provided at its lower end with a bolt 44. The bolt 44 passes through one end of a metal bracket 35, and a nut 44a is screwed to the bolt 44. Through the bolt 44 and the nut 44a, the air bag case 43 is fastened to the bracket 35. The other end of the bracket 35 is welded and fixed to a metal reinforcement 39 for the instrument panel A. The reinforcement 39 extends in the widthwise direction of the vehicle, and both ends of the reinforcement 39 are fixed to the vehicle body (not shown). That is, the lower end of the air bag case 43 is connected to the reinforcement 39 via the bracket 35.

The air bag case 43 is further provided with hooklike fittings 37 fixed thereto, and is hooked to the tubular section 23 with the fittings 37 passing through the tubular section 23. Since the fittings 37 are inserted through the elongated holes 29, the fittings 37 are caught in the elongated holes 29 when the air bag expands into the cabin, thus preventing the back-up member 22 from being sprung out to the cabin.

The air bag in a folded state is housed in the air bag case 43, and the inflator generates gas upon detection of the shock applied on the vehicle. Due to the gas generated by the activation of the inflator, the air bag is inflated and deployed. If the pressure for deploying the air bag is applied on the door section 17 via the plate section 20, the rupturable portion 7 and the door hinge part 9 are ruptured, and the door section 17 is rotated around the plate-side hinge section 27 together with the plate section 20 of the back-up member 22, so that the door section 17 opens toward the cabin.

Method for Fabricating Instrument Panel

Figure 7:
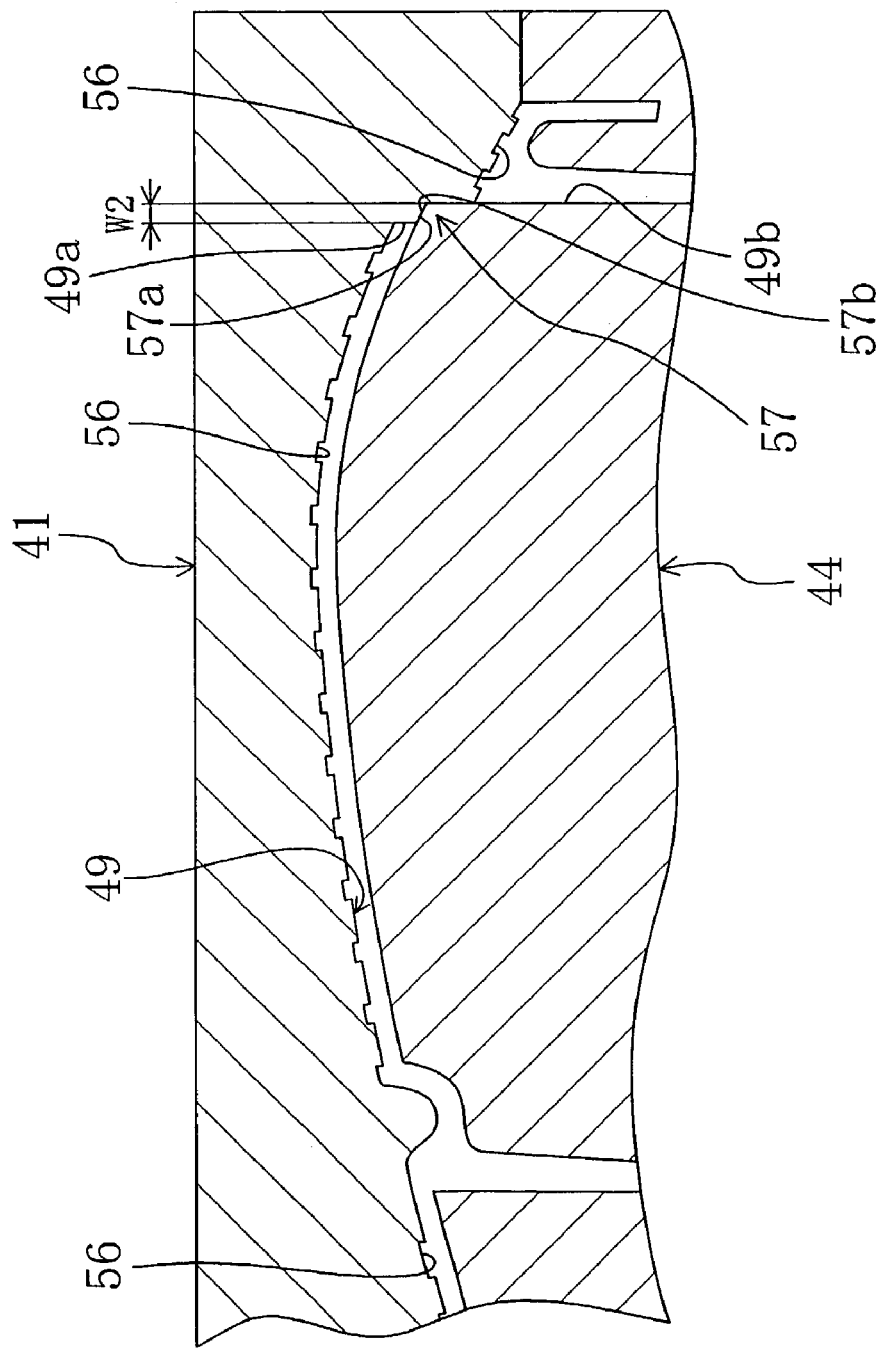
FIG. 7 is a cross-sectional view of a mold assembly for molding a back-up member.

Hereinafter, a method for fabricating the instrument panel A equipped with the air bag door section 17 will be described. First, a mold assembly for use in fabricating the instrument panel A is described below. FIG. 7 shows a mold assembly 4 for injection molding the back-up member 22 for the door section 17. The mold assembly 4 includes a first die 41 and a second die 44. The first die 41 has a molding surface for molding the top faces of the plate section 20, back-up section 25 and plate-side hinge section 27 of the back-up member 22. On the other hand, the second die 44 has a molding surface for molding the bottom faces of the plate section 20, back-up section 25 and plate-side hinge section 27, and the tubular section 23. Between the molding surfaces of the first and second dies 41 and 44, a cavity 49 is formed. This cavity 49 makes it possible to integrally mold the tubular section 23, plate section 20, back-up section 25 and plate-side hinge section 27.

The cavity 49 includes: a plate section molding portion 49a for molding the extreme end of the plate section 20; and an aperture edge molding portion 49b for molding the outer edge of the shooting aperture associated with the extreme end of the plate section 20. The mold assembly 4 is formed with a sealing section 57 for blocking the communication between the plate section molding portion 49a and the aperture edge molding portion 49b. The sealing section 57 includes a first sealing part 57a formed at the first die 41, and a second sealing part 57b formed at the second die 44. The first sealing part 57a includes: a main sealing portion having a surface that is continuous with the plate section molding portion 49a and that receives a clamping pressure; and a secondary sealing portion that is continuous with the main sealing portion and extends next to the aperture edge molding portion 49b in a mold sliding direction. The second sealing part 57b is formed into a shape matching that of the first sealing part 57a. The first and second sealing parts 57a and 57b are pressed against each other so that no liquid flows therebetween, thus blocking the communication between the plate section molding portion 49a and the aperture edge molding portion 49b. In other words, the sealing section 57 makes it possible to form an extreme-end-side gap between the extreme end of the plate section 20 and the outer edge of the shooting aperture 19 associated with the extreme end. Furthermore, the position of the plate section molding portion 49a is shifted upward from that of the aperture edge molding portion 49b by a predetermined distance as shown in FIG. 7.

A width W2 of the sealing section 57 is substantially constant along the entire length of the sealing section 57. The sealing section 57 is continuous with another sealing sections (not shown) of the mold assembly 4 which serve to form lateral-end-side gaps between the lateral ends of the plate section 20 and the outer edges of the shooting aperture 19 associated with the lateral ends, and said another sealing sections each have a width substantially equal to the width W2. Thus, in the molded back-up member 22 (which is not yet welded to the panel main body 1), the extreme-end-side gap and the lateral-end-side gaps have the identical widths W2.

It should be noted that the molding surface of the first die 41 facing the cavity 49 is formed with a plurality of recesses 56 that are spaced a certain distance apart. Due to the recesses 56, the weld protrusions 33 are formed at the plate section 20 and the back-up section 25.

Described below is how the instrument panel A is fabricated using the mold assembly 4 formed as described above. First, molten resin is injected into the cavity 49 of the mold assembly 4. After the molten resin has been solidified, the first and second dies 41 and 44 are opened to demold the back-up member 22. In the molded back-up member 22 that has been taken out of the mold assembly 4, the extreme end of the plate section 20 assumes an open position for opening the shooting aperture 19, in which position the extreme end is shifted upward from the shooting aperture 19 of the back-up section 25 by a predetermined distance. In this case, as viewed from the top side of the plate section 20, the extreme-end-side gap and the lateral-end-side gaps each have the width W2.

Next, the plate section 20 and back-up section 25 of the back-up member 22 are vibration welded, at top sides thereof, to the base member 10 having the skin member 11. During the welding, the base member 10 is pressed against the top side of the plate section 20 to press the plate section 20 toward the shooting aperture 19. Thus, the plate section 20 is rotated around the plate-side hinge section 27 so that the plate section 20 is flush with the back-up section 25, and in this state, the plate section 20 is welded to the base member 10. The extreme end of the welded plate section 20 assumes a close position for closing the shooting aperture 19, and thus the extreme-end-side gap 31a has the width W1 while the lateral-end-side gaps 31b are each allowed to have the width W2. That is, when the plate section 20 is welded to the base member 10, the plate section 20 is rotated around the plate-side hinge section 27 so that the plate section 20 assumes the close position for closing the shooting aperture 19. As a result, the width W1 of the extreme-end-side gap 31a after the welding is narrower than the width W2 of the gap formed between the extreme end of the plate section 20 and the outer edge of the shooting aperture 19 of the back-up section 25 after the molding.

In the present embodiment, the base member 10 does not have to be covered with the skin member 11. Alternatively, the base member 10 with no skin member 11 may be covered with the skin member 11 after the back-up member 22 has been welded to the base member 10.

As described above, according to the present embodiment, the back-up member 22 is molded such that the width of the gap, formed between the extreme end of the plate section 20 and the outer edge of the shooting aperture 19 associated with the extreme end, is wider than the width W1 of the extreme-end-side gap 31a obtained after the welding. Therefore, it becomes possible to effectively prevent the connection of the extreme end of the plate section 20 to the outer edge of the shooting aperture 19 due to burrs. Further, after the plate section 20 has been welded to the door section 17, the pressure receiving surface of the plate section 20 to be pressed by the air bag is enlarged at the extreme end of the plate section 20, and as a result the area of the gap formed between the extreme end of the plate section 20 and the outer edge of the shooting aperture 19 is minimized. In other words, the area at which the plate section 20 is welded to the bottom face of the door section 17 can be maximized. This increases the stiffness of the door section 17, and prevents a pressure for deploying the air bag from directly acting on the extreme-end-side gap 31a. Consequently, a crack will not be made around the rupturable portion 7 adjacent to the extreme-end-side gap 31a, and thus the door section 17 and the plate section 20 can be opened with stability.

Besides, the back-up member 22 is molded such that the extreme end of the plate section 20 is shifted from the position thereof flush with the back-up section 25 in the direction opposite to that in which the plate section 20 is pressed via the base member 10 during the welding. Therefore, the plate section 20 can be easily rotated to the shooting aperture 19 by utilizing the pressure applied on the plate section 20 via the base member 10 during the welding.

In addition, in Embodiment 3, since the back-up member 22 is integrally formed with the tubular section 23, a component for accommodating the air bag device 42 does not have to be additionally provided, which contributes to a reduction in the number of components.

In Embodiment 3, the back-up member 22 is molded such that the extreme end of the plate section 20 is shifted upward from the position of the shooting aperture 19. Alternatively, the back-up member 22 may be molded such that the extreme end of the plate section 20 is shifted downward from the position of the shooting aperture 19 by a predetermined distance, and then the plate section 20 may be pressed toward the shooting aperture 19 with the use of, e.g., a pressing tool (not shown) so that the plate section 20 is rotated around the plate-side hinge section 27 and welded to the base member 10.

<Embodiment 4>

Figure 8:
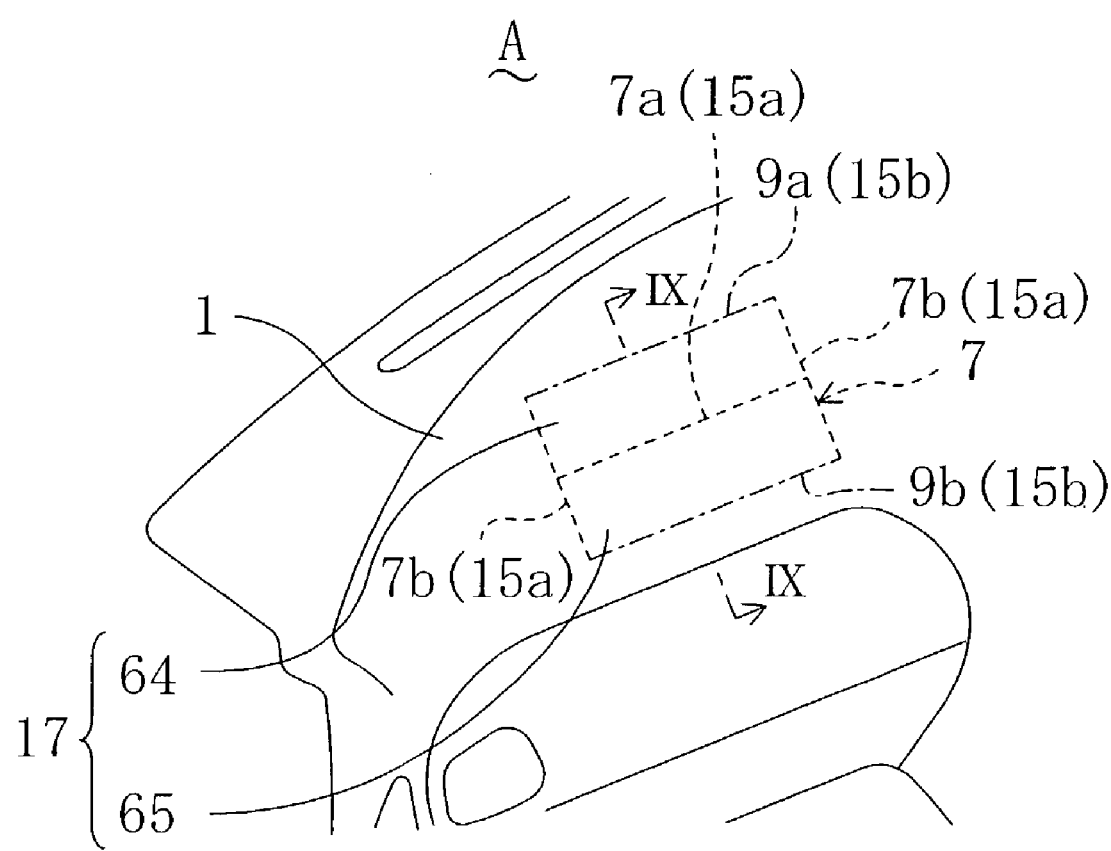
FIG. 8 is a perspective view partially showing the main body of an instrument panel including an air bag door according to Embodiment 4 of the present invention.

Hereinafter, Embodiment 4 of the present invention will be described. In the following description, the same elements are identified by the same reference characters as those used in Embodiment 3, and the detailed description thereof will be omitted. As shown in FIG. 8, a door section 17 is provided at an upper surface of an instrument panel A, and is divided into a front door part 64 and a rear door part 65 which function as a so-called double door.

To be more specific, the door section 17 is defined with a rupturable portion 7 including: a transverse rupturable part 7a extending in a widthwise direction of a vehicle; and right and left longitudinal rupturable parts 7b extending in a lengthwise direction of the vehicle from both the ends of the transverse rupturable part 7a. The transverse and longitudinal rupturable parts 7a and 7b form an approximate H-shape. Door hinge portions 9a and 9b are provided at the front and rear of the door section 17, respectively, so as to extend in parallel with the transverse rupturable part 7a. The front door hinge portion 9a located closer to the front of the vehicle connects the front ends of the longitudinal rupturable parts 7b to each other, while the rear door hinge portion 9b located closer to the rear of the vehicle connects the rear ends of the longitudinal rupturable parts 7b to each other. A rectangular region surrounded by the rupturable parts 7a and 7b and the door hinge portion 9a forms the front door part 64 located in front of the transverse rupturable part 7a, while another rectangular region surrounded by the rupturable portions 7a and 7b and the door hinge portion 9b forms the rear door part 65 located behind the transverse rupturable part 7a. In such an arrangement, the front and rear door parts 64 and 65 are opened in mutually opposite directions. That is, the front and rear door parts 64 and 65 function as a double door in which the front door part 64 opens toward the front of the vehicle, and the rear door part 65 opens toward the rear of the vehicle.

Figure 9:
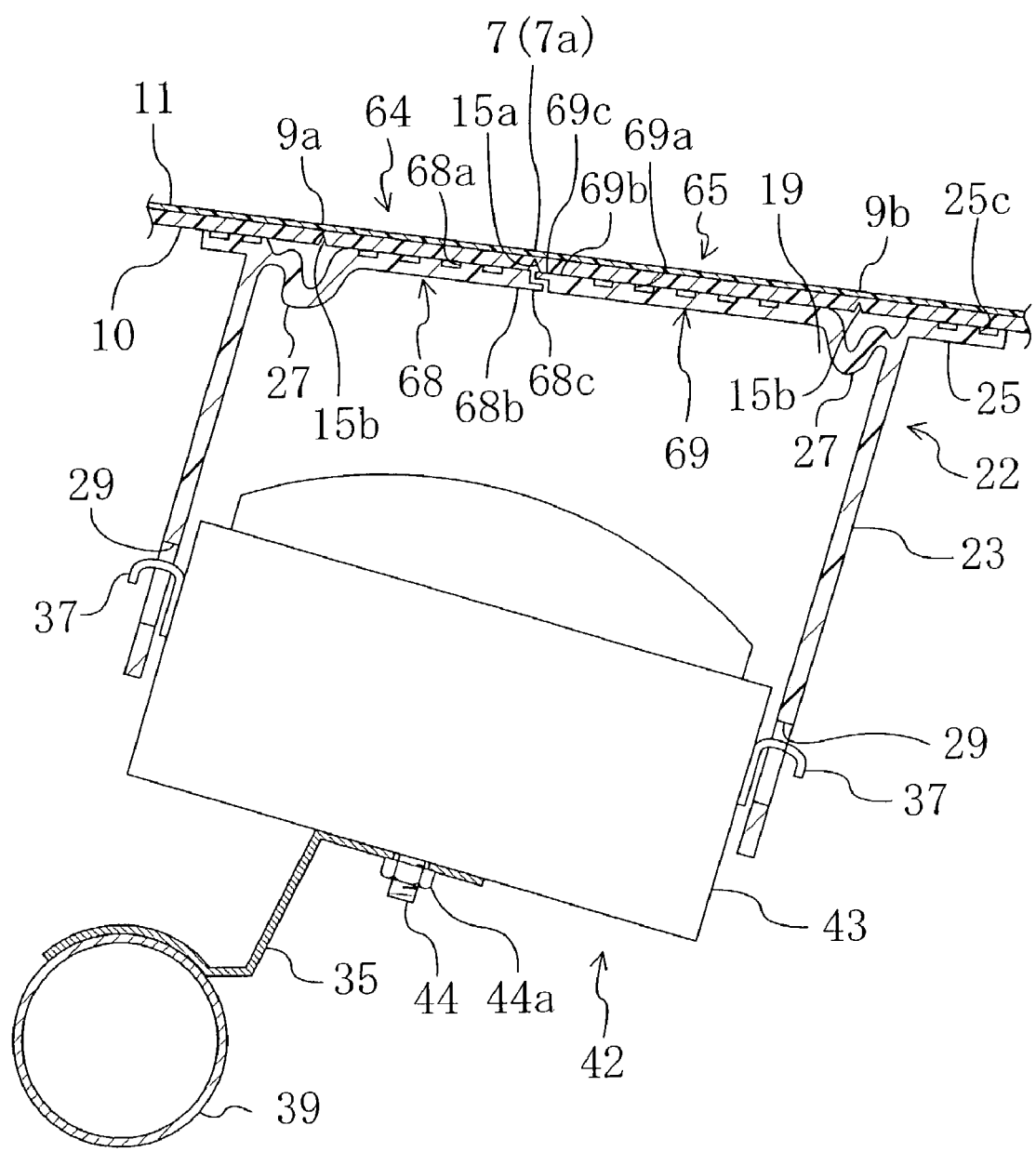
FIG. 9 is a cross-sectional view taken along the line IX—IX in FIG. 8.

As shown in FIG. 9, a back-up member 22 at the bottom side of a base member 10 includes a tubular section 23, a back-up section 25, plate sections 68 and 69, and plate-side hinge sections 27 and 27, which are integrally formed with each other. It should be noted that a portion of the back-up member 22 located at the left side of FIG. 9 is closer to the front of the vehicle, while a portion of the back-up member 22 located at the right side of FIG. 9 is closer to the rear of the vehicle.

The back-up section 25 has a rectangular shooting aperture 19 through which an air bag expands into a cabin upon activation of an air bag device 42, and is formed to extend outward from an outer edge of the shooting aperture 19 and away from the door section 17. The back-up section 25 is provided at its top side with a plurality of weld protrusions 25c that are spaced a certain distance apart. Through the weld protrusions 25c, the top side of the back-up section 25 is vibration welded to the bottom side of the base member 10 at its portion located around the door section 17.

The tubular section 23 is formed into a tubular shape extending from the outer edge of the shooting aperture 19 so that the extended end of the tubular section 23 is away from the base member 10 at the outside of the door section 17.

The two plate sections 68 and 69 are provided adjacent to each other so that the plate sections 68 and 69 are associated with the front and rear door parts 64 and 65, respectively. The front plate section 68 located closer to the front of the vehicle and the rear plate section 69 located closer to the rear of the vehicle are each formed into a rectangular plate shape. The plate sections 68 and 69 are provided at the top sides thereof with weld protrusions 68a and 69a, respectively. Through the weld protrusions 68a and 69a, the top side of each of the plate sections 68 and 69 is vibration welded to the bottom side of the base member 10 at its portion located in the door parts 64 and 65.

Opposing extreme ends 68b and 69b of both the plate sections 68 and 69 detachably overlap with each other. To be more specific, the extreme end 68b of the front plate section 68 is formed with a lower projection 68c projecting toward the rear plate section 69 and extending in the widthwise direction of the vehicle, while the extreme end 69b of the rear plate section 69 is formed with an upper projection 69c projecting toward the front plate section 68 and extending in the widthwise direction of the vehicle. The lower projection 68c is formed by cutting a stepped notch at an upper corner of the extreme end 68b (i.e., at a corner thereof adjacent to the base member 10). On the other hand, the upper projection 69c is formed by cutting a stepped notch at a lower corner of the extreme end 69b (i.e., at a corner thereof opposite to the base member 10). The thicknesses of the projections 68c and 69c are substantially half of those of the plate sections 68 and 69, respectively, and the projections 68c and 69c are located so that the upper projection 69c overlies the lower projection 68c.

One of the plate-side hinge sections 27 is located closer to the front of the vehicle and is associated with the front door hinge portion 9a, while the other plate-side hinge section 27 is located closer to the rear of the vehicle and is associated with the rear door hinge portion 9b. To be more specific, the front plate-side hinge section 27 is provided to extend along the entire length of a side of the rectangular front plate section 68 which is closer to the front of the vehicle, while the rear plate-side hinge section 27 is provided to extend along the entire length of a side of the rectangular rear plate section 69 which is closer to the rear of the vehicle.

Method for Fabricating Instrument Panel

Figure 10:
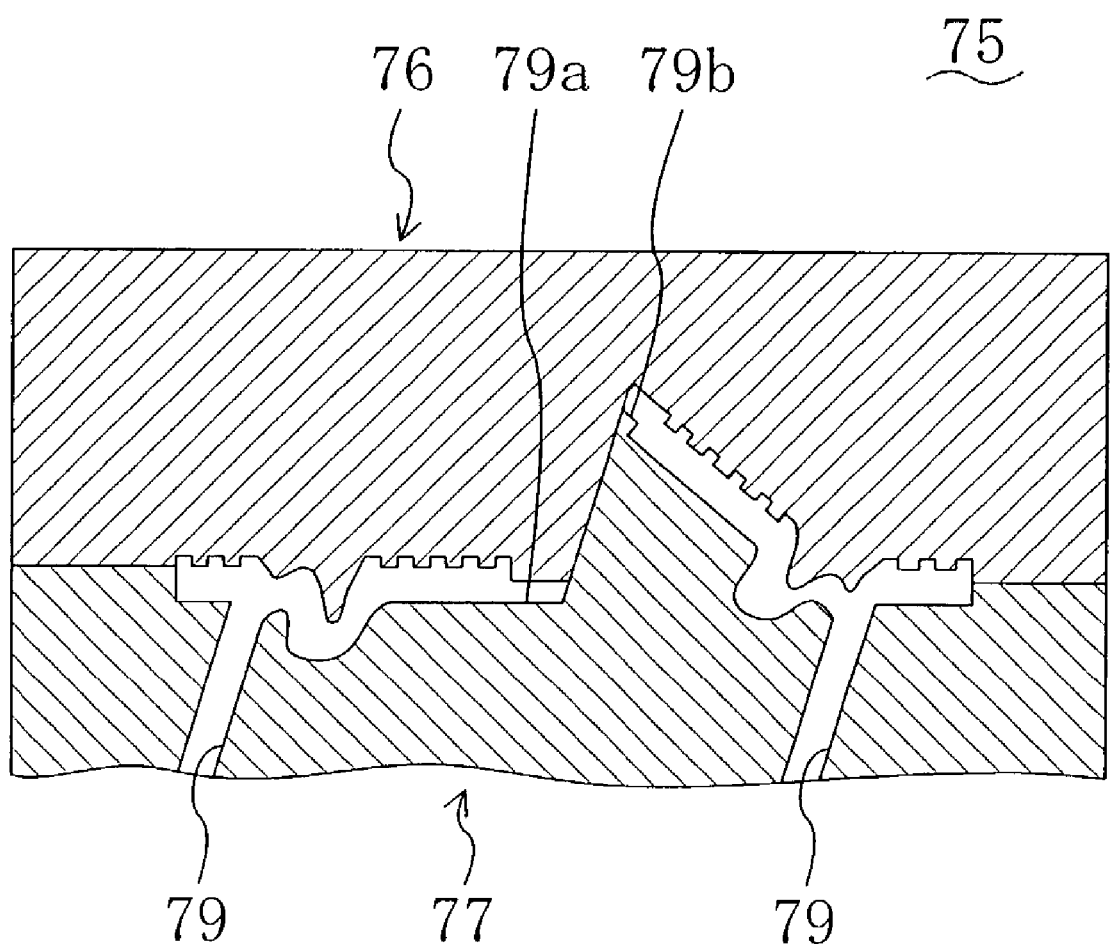
FIG. 10 is a cross-sectional view of a mold assembly for molding a back-up member.

Hereinafter, a method for fabricating the instrument panel A including the air bag door 17 will be described. First, a mold assembly for use in fabricating the instrument panel A is described below. FIG. 10 shows a mold assembly 75 for injection molding the back-up member 22 for the door section 17. The mold assembly 75 includes a first die 76 and a second die 77, and a cavity 79 is formed between molding surfaces of both the dies 76 and 77. The cavity 79 makes it possible to integrally mold the tubular section 23, back-up section 25, plate sections 68 and 69, and plate-side hinge sections 27 and 27.

The cavity 69 includes: a front molding portion 79a for molding the lower projection 68c at the extreme end 68b of the front plate section 68; and a rear molding portion 79b for molding the upper projection 69c at the extreme end 69b of the rear plate section 69. The rear molding portion 79b is formed so that the position thereof is shifted, by a predetermined distance, to a deeper region of the first die 76 with respect to the front molding section 79a. Further, when the first die 76 and the second die 77 abut against each other, a sealing portion for shutting off the flow of resin between the molding portions 79a and 79b is formed therebetween.

Described below is how the instrument panel A is fabricated using the mold assembly 75 formed as described above. First, molten resin is injected into the cavity 79 of the mold assembly 75. After the molten resin has been solidified, the first and second dies 76 and 77 are opened to demold the back-up member 22. In the molded back-up member 22 that has been taken out of the mold assembly 75, the extreme end 69b of the rear plate section 69 assumes an open position for opening the shooting aperture 19, in which position the extreme end 69b is shifted upward from the shooting aperture 19 by a predetermined distance. That is, a gap is formed between the projections 68c and 69c of the extreme ends 68b and 69b of the plate sections 68 and 69.

Next, the plate sections 68 and 69 and back-up section 25 of the back-up member 22 are vibration welded, at top sides thereof, to the base member 10 (to which a skin member 11 has been connected). During the welding, the base member 10 is pressed against the top side of the rear plate section 69 to press it toward the shooting aperture 19. Thus, the rear plate section 69 is rotated around the corresponding plate-side hinge section 27 so that the rear plate section 69 is flush with the front plate section 68, and in this state, the plate sections 68 and 69 are welded to the base member 10. Due to this rotation, the rear plate section 69 assumes a close position for closing the shooting aperture 19, and the upper projection 69c and the lower projection 68c are overlapped. To be more specific, the upper projection 69c at the extreme end 69b of the rear plate section 69 overlies the lower projection 68c at the extreme end 68b of the front plate section 68, with the upper projection 69c located adjacent to the base member 10. In this overlapped state, the projections 68c and 69c may abut against each other, or they may be prevented from abutting against each other so that a small gap is formed therebetween. The instrument panel A including the door section 17 is fabricated in the manner described above.

As described above, according to the present embodiment, the extreme end 69b of the rear plate section 69 overlies the extreme end 68b of the front plate section 68. In such an embodiment, even if a pressing force is applied on the panel main body 1 and on the rear plate section 69 that is located in front of a vehicle occupant and is easily pressed by the occupant, the extreme end 68b of the front plate section 68 can also receive the pressing force since the upper projection 69c abuts against the lower projection 68c. Thus, the pressing force can be dispersed to both the plate sections 68 and 69. This improves the effect of reinforcing the door pars 64 and 65 to increase the stiffness of the door parts 64 and 65, and thus the door parts 64 and 65 are unlikely to dent. Accordingly, the present embodiment is considerably effective in protecting the door parts 64 and 65 from a pressure applied by the occupant.

Further, according to the present embodiment, the upper projection 69c of the rear plate section 69, located closer to the occupant, overlies the lower projection 68c of the front plate section 68. Therefore, when the air bag expands into the cabin, the rear plate section 69 can be opened before the front plate section 68 is opened. As a result, the safety of the occupant can be further improved.

Furthermore, since the front and rear plate sections 68 and 69 are integrally formed with the back-up member 22, it is unnecessary to separately mold these plate sections 68 and 69. This makes it possible to reduce the number of components, omit the step of attaching the molded plate sections 68 and 69 to the back-up member 22, and simplify the step of assembling the instrument panel A.

Besides, since the extreme ends 68b and 69b of both the plate sections 68 and 69 are overlapped with each other, a gap between the extreme ends 68b and 69b can be eliminated. Therefore, the pressure receiving surface of the plate sections 68 and 69 to be pressed by the air bag can be enlarged at the extreme ends 68b and 69b, and the area at which the plate sections 68 and 69 are welded to the bottom faces of the door parts 64 and 65 can be further enlarged. This enhances the effect of reinforcing the door parts 64 and 65, and prevents a pressure for deploying the air bag from directly acting on a part of the door section 17 in the vicinity of the transverse rupturable part 7a located between the door parts 64 and 65. As a result, the part of the door section 17 in the vicinity of the transverse rupturable part 7a does not crack, and thus the door parts 64 and 65 can be opened with stability together with the plate sections 68 and 69.

In Embodiment 4, the back-up member 22 is molded so that a gap having a predetermined width is formed between the extreme ends 68b and 69b of the plate sections 68 and 69, and the rear plate section 69 can be rotated to overlap the extreme ends 68b and 69b with each other when the back-up member 22 is welded to the base member 10. Therefore, it is possible to easily and reliably, i.e., efficiently, fabricate the instrument panel A including the back-up member 22 in which the extreme ends 68b and 69b of the plate sections 68 and 69 are overlapped.

As for other points, the instrument panel A of the present embodiment is formed in the same way as in Embodiment 3, and thus achieves the same effects as in Embodiment 3.

In Embodiment 4, the back-up member 22 is molded so that the rear plate section 69 assumes the open position for opening the shooting aperture 19, in which position the rear plate section 69 is shifted upward from the shooting aperture 19. However, the present embodiment is not limited to such an arrangement. For example, the back-up member 22 may be molded so that the rear plate section 69 is located in the shooting aperture 19 while the front plate section 68 is rotated downward from the shooting aperture 19, or the back-up member 22 may be molded so that both the plate sections 68 and 69 each assume the open position.

Besides, in Embodiment 4, the arrangement in which the extreme end 69b of the rear plate section 69 overlies the extreme end 68b of the front plate section 68 has been described. Alternative arrangement may be provided in which the extreme end 68b of the front plate section 68 overlies the extreme end 69b of the rear plate section 69. However, in order to effectively deal with a pressure applied on the door section 17 by the occupant, it is preferable to employ the arrangement in which the extreme end 69b of the rear plate section 69 is located over the extreme end 68b of the front plate section 68.

<Embodiment 5>

Figure 11:
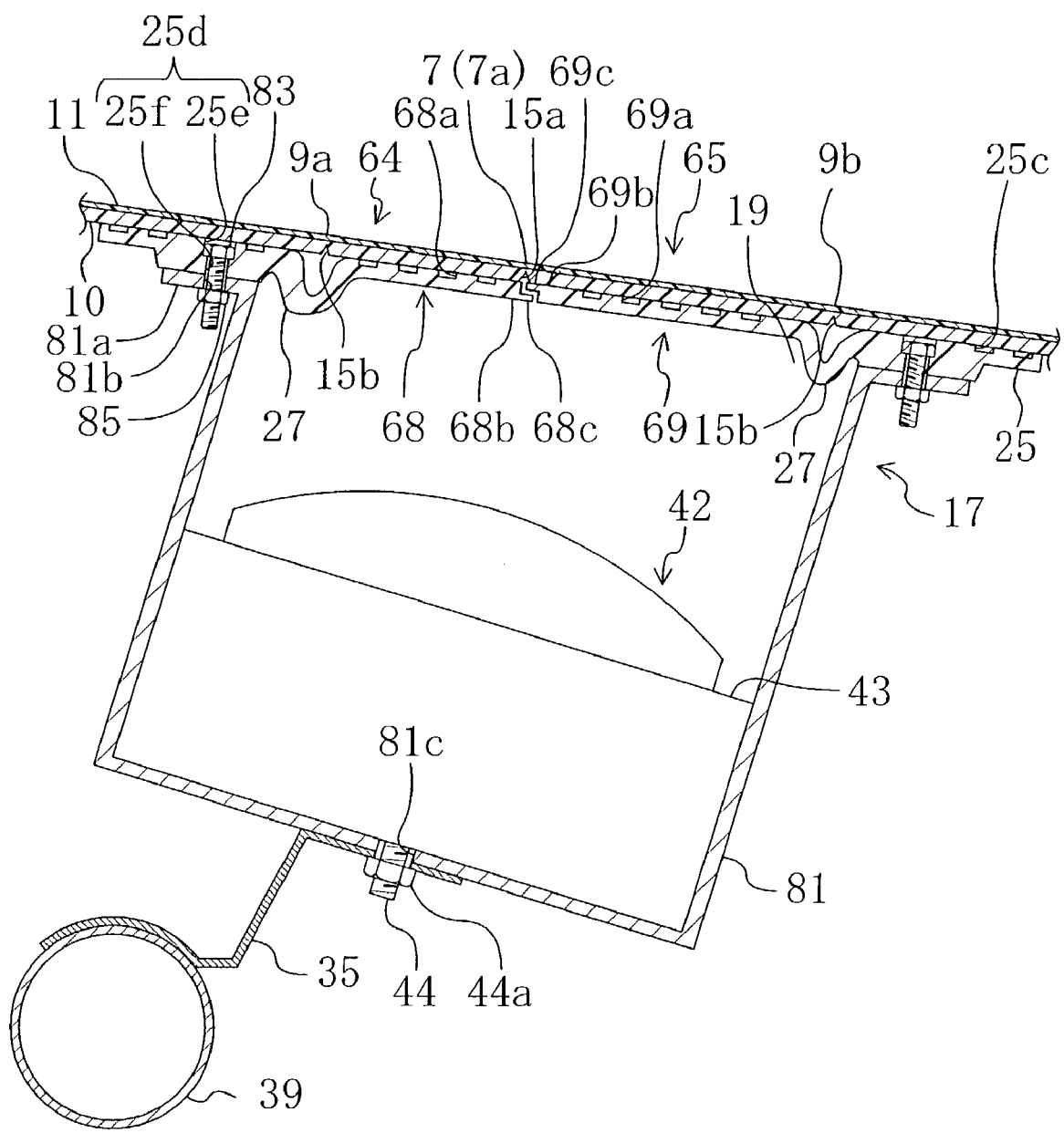
FIG. 11 is a cross-sectional view of the main body of an instrument panel according to Embodiment 5 of the present invention.

Hereinafter, Embodiment 5 of the present invention will be described. In the following description, the same elements are identified by the same reference characters as those used in Embodiment 4, and the detailed description thereof will be omitted. As shown in FIG. 11, according to Embodiment 5, an instrument panel includes a back-up member 22 formed by a resin member in which a back-up section 25, plate sections 68 and 69, and plate-side hinge sections 27 and 27 are integrally formed. In other words, unlike Embodiment 4, the back-up member 22 is not integrally formed with a tubular section in Embodiment 5.

The back-up section 25 is integrally formed with a plurality of junctions 25d that are spaced a certain distance apart. The junctions 25d each include: a boxlike recess 25e opened upward; and a through hole 25f passing through the bottom of the recess 25e. One of the junctions 25d is located in front of the plate section 68, while the other junction 25d is located behind the plate section 69.

The back-up member 22 is further provided at its lower part with a metal support member 81 that is opened at its upper portion and is formed into an approximate U-shape in cross section. The upper end of the support member 81 is integrally formed with a fixture part 81a projecting outward. The fixture part 81a is formed with through holes 81b each provided to communicate with the through hole 25f of the corresponding junction 25d. Bolts 83 are inserted through the through holes 25f of the junctions 25d and the through holes 81b of the fixture part 81a such that the heads of the bolts 83 are unrotatably buried in the recesses 25e, and nuts 85 are screwed to the threads of the bolts 83 protruding downward from the through holes 81b. In this manner, the fixture part 81a is fastened to the junctions 25d.

The support member 81 is provided at its bottom with a through hole 81c. A bolt 44 provided at the lower end of an air bag case 43 is inserted through the through hole 81c and one end of a metal bracket 35, and a nut 44a is screwed to the bolt 44, thus fastening the support member 81 to the bracket 35. The other end of the bracket 35 is welded and fixed to a reinforcement 39 for the instrument panel. In other words, an air bag device 42 including the air bag case 43 is attached to the bottom of the support member 81 and fixed to the bracket 35 supported by the reinforcement 39.

In the present embodiment, like Embodiment 4, the back-up member 22 is molded so that the rear plate section 69 assumes an open position for opening a shooting aperture 19, in which position the rear plate section 69 is shifted upward from the shooting aperture 19 by a predetermined distance. Before welding the back-up member 22 to the base member 10, the bolts 83 are inserted into the through holes 25e of the junctions 25d, and in this state, the back-up member 22 is welded to the base member 10. During the welding, the base member 10 is pressed against the top side of the rear plate section 69 to press the rear plate section 69 toward the shooting aperture 19 and to rotate the rear plate section 69 so that it is flush with the front plate section 68. In this manner, the front and rear plate sections 68 and 69 can be welded to the base member 10 at its portion located at front and rear door parts 64 and 65, and at the same time, the back-up section 25 can be welded to the base member 10 at its portion located around the front and rear door parts 64 and 65. Furthermore, an upper projection 69c at an extreme end 69b of the rear plate section 69 overlies a lower projection 68c at an extreme end 68b of the front plate section 68.

By fastening the support member 81, in which the air bag case 43 is housed, to the back-up section 25 using bolts, the support member 81 can be fixed to the base member 10.

As for other points, the instrument panel including the back-up member 22 according to the present embodiment is formed in the same way as in Embodiment 4, and thus achieves the same effects as in Embodiment 4.

<Embodiment 6>

Figure 12:
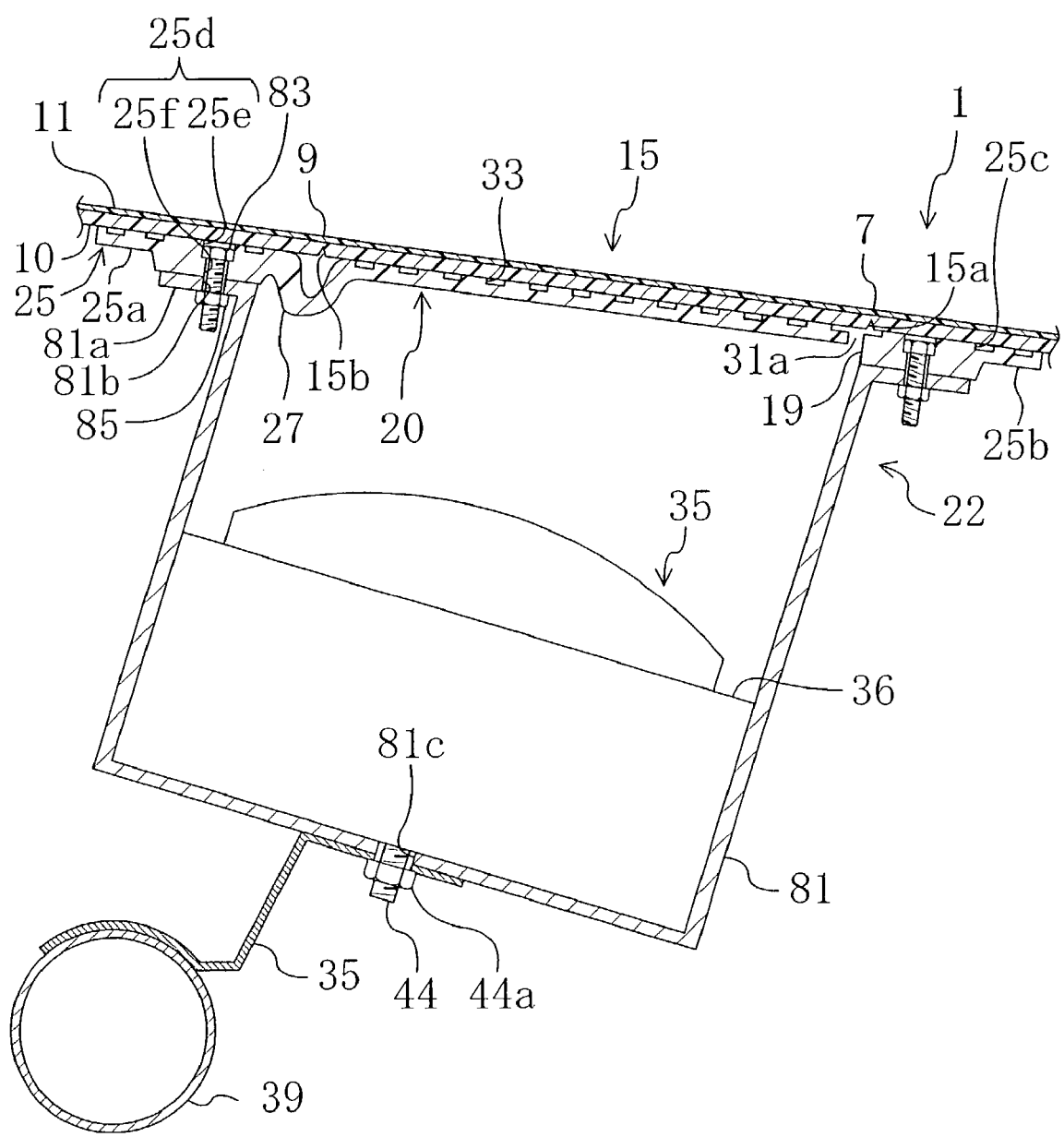
FIG. 12 is a cross-sectional view of the main body of an instrument panel according to Embodiment 6 of the present invention.

Hereinafter, Embodiment 6 of the present invention will be described. In the following description, the same elements are identified by the same reference characters as those used in Embodiment 3, and the detailed description thereof will be omitted. As shown in FIG. 12, according to Embodiment 6, an instrument panel includes a back-up member 22 formed by a resin member in which a back-up section 25, a plate section 20, and a plate-side hinge section 27 are integrally formed. In other words, unlike Embodiment 3, the back-up member 22 is not integrally formed with a tubular section in Embodiment 6.

The back-up section 25 is integrally formed with a plurality of junctions 25d that are spaced a certain distance apart. The junctions 25d each include: a boxlike recess 25e opened upward; and a through hole 25f passing through the bottom of the recess 25e. One of the junctions 25d is located in front of the plate section 20, while the other junction 25d is located behind the plate section 20.

The back-up member 22 is further provided at its lower part with a metal support member 81 that is opened at its upper portion and is formed into an approximate U-shape in cross section. The upper end of the support member 81 is integrally formed with a fixture part 81a projecting outward. The fixture part 81a is formed with through holes 81b each provided to communicate with the through hole 25f of the corresponding junction 25d. Bolts 83 are inserted through the through holes 25f of the junctions 25d and the through holes 81b of the fixture part 81a such that the heads of the bolts 83 are unrotatably buried in the recesses 25e, and nuts 85 are screwed to the threads of the bolts 83 protruding downward from the through holes 81b. In this manner, the fixture part 81a is fastened to the junctions 25d.

The support member 81 is provided at its bottom with a through hole 81c. A bolt 44 provided at the lower end of an air bag case 43 is inserted through the through hole 81c and one end of a metal bracket 35, and a nut 44a is screwed to the bolt 44, thus fastening the support member 81 to the bracket 35. The other end of the bracket 35 is welded and fixed to a reinforcement 39 for the instrument panel. In other words, an air bag device 42 including the air bag case 43 is attached to the bottom of the support member 81 and fixed to the bracket 35 supported by the reinforcement 39.

As for other points, the instrument panel including the back-up member 22 according to the present embodiment is formed in the same way as in Embodiment 3, and thus achieves the same effects as in Embodiment 3.

<Other Embodiments>

In Embodiments 3 through 6, when the door section 17 opens, the base member 10 and skin member 11 are ruptured at the door hinge part 9 of the door section 17. However the present invention is not limited to such an arrangement. For example, another arrangement may be provided in which, when the door section 17 opens, the base member 10 is ruptured at the door hinge part 9 while the skin member 11 is not ruptured but one-piece at the door hinge part 9, or still another arrangement may be provided in which, when the door section 17 opens, the base member 10 is bended without being ruptured at the door hinge part 9.

Further, in Embodiments 1 through 6, the door section 17 is of a seamless type. Alternatively, the door section 17 may be of an insertable type in which an opening is formed in the panel main body 1 and a door member is inserted into the opening so that the door member is engaged therein.

Furthermore, in Embodiments 1 through 6, the description has been made on the supposition that the present invention is applied to an instrument panel. However the application of the present invention is not limited to an instrument panel. For example, the present invention may be applied to an air bag door section provided at a steering wheel of a vehicle or a side panel of a vehicle door.

Besides, in Embodiments 1 through 6, an arrangement is provided in which the panel main body 1 is covered with the skin member 11. Alternative arrangement may be provided in which the panel main body 1 is not covered with the skin member 11.

What is claimed is:

1. An air-bag-door-equipped vehicle interior trim article comprising a panel main body in which a door section is defined with a rupturable portion that is formed in the panel main body and that is to be ruptured to open the door section upon activation of an air bag device,
   wherein the interior trim article further comprises: a reinforcing plate section that comprises a base end and an extreme end, and that is welded to the bottom face of the door section; a frame body, provided in connection with the plate section, for accommodating the air bag device; and a hinge section through which the base end of the plate section is connected to the frame body,
   wherein the plate section, the frame body and the hinge section are integrally formed,
   wherein the frame body comprises: a rectangular tubular main section extending away from the panel main body; and a flange section that extends outward from an outer end of the tubular main section located adjacent to the panel main body, and that is welded to the bottom face of the panel main body at a portion thereof located outwardly of the door section,
   wherein the base end of the plate section is integrally formed with the frame body via the hinge section, while the extreme end of the plate section detachably abuts against a surface of the tubular main section of the frame body facing the panel main body before the rupturable portion is ruptured, and
   wherein a part of the rupturable portion with which the door section is defined and which is adjacent to the extreme end of the plate section is located outwardly of the extreme end of the plate section.

2. The interior trim article of claim 1, wherein the hinge section is formed into an approximately U-shape in cross section which protrudes away from the panel main body within the frame body, and
   wherein a part of the rupturable portion with which the door section is defined and which is adjacent to the hinge section is formed at a portion of the panel main body facing an approximately U-shaped groove formed by the hinge section.

3. A method for fabricating the air-bag-door-equipped vehicle interior trim article according to claim 1 or 2, the method comprising the steps of:
   a) integrally molding the plate section, the frame body and the hinge section so that the base end of the plate section is connected to the frame body via the hinge section, and the extreme end of the plate section is spaced apart from the surface of the frame body facing the panel main body by a predetermine distance; and
   b) rotating the plate section around the hinge section so that the extreme end of the plate section abuts against or neighbors on the surface of the frame body facing the panel main body, and welding the plate section and the flange section of the frame body to the panel main body,
   wherein the step b) is performed after the step a) has been performed.

4. A method for fabricating the air-bag-door-equipped vehicle interior trim article according to claim 1 or 2, the method comprising the steps of:
   a) molding the frame body in which the tubular main section and the flange section are integrally formed, inserting the tubular main section of the frame body into a mold assembly, and injecting a resin material to the mold assembly, thereby integrally molding a leg section integrally formed with the tubular main section, the plate section, and the hinge section through which the plate section and the leg section are connected, such that the extreme end of the plate section is spaced apart from the surface of the frame body facing the panel main body by a predetermined distance; and b) rotating the plate section around the hinge section so that the extreme end of the plate section detachably abuts against the surface of the tubular main section of the frame body facing the panel main body before the rupturable portion is ruptured, and welding the plate section and the flange section of the frame body to the panel main body, wherein the step b) is performed after the step a) has been performed.

5. The air-bag-door-equipped vehicle interior trim article according to claim 1, wherein the surface of the tubular main section of the frame body comprises an end face that faces the panel main body and is located at a lower level than a top face of the flange section by a thickness of the plate section, and wherein the plate section abuts against the end face.

* * * * *